United States Patent [19]

Park

[11] Patent Number: 5,633,757
[45] Date of Patent: May 27, 1997

[54] PROJECTION LENS

[75] Inventor: Sung C. Park, Seoul, Rep. of Korea

[73] Assignee: Goldstar Co., Ltd., Seoul, Rep. of Korea

[21] Appl. No.: 369,124

[22] Filed: Jan. 5, 1995

[30] Foreign Application Priority Data

Dec. 10, 1994 [KR] Rep. of Korea ............... 1994/33620

[51] Int. Cl.⁶ ............................................. G02B 3/00
[52] U.S. Cl. ............................................. 359/650; 359/649
[58] Field of Search ............................................. 359/650, 649, 359/651

[56] References Cited

U.S. PATENT DOCUMENTS

| | | | |
|---|---|---|---|
| 4,300,817 | 11/1981 | Betensky | 359/651 |
| 4,348,081 | 9/1982 | Betensky | 359/650 |
| 4,526,442 | 7/1985 | Betensky et al. | 359/651 |
| 4,685,774 | 8/1987 | Moskovich | 359/650 |
| 4,697,892 | 10/1987 | Betensky | 359/650 |
| 4,707,684 | 11/1987 | Janke et al. | 340/530 |
| 4,770,513 | 9/1988 | Fujie et al. | 359/649 |
| 4,775,028 | 10/1988 | de Heering | 181/124 |
| 4,776,681 | 10/1988 | Moskovich | 359/649 |
| 4,924,244 | 5/1990 | Kataoka et al. | 359/649 |
| 4,950,062 | 8/1990 | Kimura et al. | 359/650 |
| 4,989,961 | 2/1991 | Yoshioka | 359/649 |
| 5,048,940 | 9/1991 | Ueda et al. | 359/649 |
| 5,066,113 | 11/1991 | Nakajima et al. | 359/649 |
| 5,200,814 | 4/1993 | Hirata et al. | 348/745 |
| 5,212,597 | 5/1993 | Yamada | 359/649 |
| 5,272,540 | 12/1993 | Hirata et al. | 348/781 |
| 5,392,431 | 2/1995 | Pfisterer | 359/650 |

Primary Examiner—Scott J. Sugarman
Assistant Examiner—Jordan M. Schwartz

[57] ABSTRACT

An improved projection lens capable of substantially and advantageously implementing a distinct picture by compensating for a chromatic aberration and a residue aberration, which includes a first lens group, including a lens element convex to a screen and having a relatively weak optical power, for eliminating a spherical surface aberration; a second lens group having positive optical power and cemented with a two side lens element having a positive optical element and a lens element having a negative optical element, which have a different dispersion from each other; a third lens group having a positive optical power on an optical axis and a radius code of a curvature surface toward an upper surface of which has the same radius code as the radius curvature surface of a cathode ray tube; and a fourth lens group having a high optical power toward an upper surface of the screen for compensating for a field dependent aberration.

25 Claims, 26 Drawing Sheets

ABERRATION DISTANCE(mm)

ABERRATION DISTANCE(mm)

PROJECTION LENS

BACKGROUND OF THE INVENTION

1. Field of the Invention

The present invention relates to a projection lens for use in combination with a cathode ray tube, and more particularly to an improved projection lens capable of substantially and advantageously implementing a distinct picture quality by compensating for chromatic aberrations and residual aberrations.

2. Description of the Conventional Art

Conventionally, a preferred form of projection lenses for wide screen television is disclosed in U.S. Pat. Nos. 4,300,817, 4,348,081, and 4,526,442.

In these previous patents, the lens units have been referred to as groups which perform specified optical functions. Here, the term "lens unit" refers to one or more lens elements or lens components which provide a defined optical function or functions in the design of the overall lens.

It is well known that a specified or defined optical function(s) of a lens or group in an overall lens may be accomplished by using one or more elements or components depending upon the correction or function desired. A decision as to whether one or more elements are used as a lens unit in an overall lens design may be based on various considerations, including but not limited to the ultimate performance of the lens, the ultimate costs of the lens, acceptable size of the lens, etc.

Accordingly, in the following specification and appended claims, the terms "lens unit" refers to one or more lens elements or lens components which provide a defined optical function or functions in the design of the overall lens.

The lens disclosed in the aforementioned patents generally comprises three lens units: from the image end, a first lens unit having at least one aspheric surface, which serves as an aberration corrector; a second lens unit including a biconvex element which supplies all or substantially all of the positive power of the lens; and a third lens unit having a concave surface towards the image end of the lens, serving as a field flattener, and essentially correcting for Petzval curvature of the lens.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of one hundred twenty-seven millimeters or greater, while the lenses of U.S. Pat. No. 4,348,081, which utilize a two-element second lens unit, including the biconvex element, may have an EFL reduced to eighty-five millimeters as designed for direct projection for a five inch diagonal CRT. The lenses described in U.S. Pat. No. 4,526,442 are designed to have a fold in the optical axis between the first and second lens units and have been designed so that the EFL is as short as one hundred twenty-six millimeters. These EFLs are provided for CRT screens having a viewing surface with an approximate five inch diagonal.

projection TV sets are rather bulky and have required high volume cabinet. One manner of reducing the cabinet size is to decrease the EFL of the projection lenses. This, of course, increases the field angle of the lens.

The EFL of the lens is a function of the total conjugate distance between the CRT and the display screen.

This is shown by the relationship:

$$OL=EFL(1+1/M)+EFL(1+M),$$

where OL is the overall conjugate distance of the system from object to image,

EFL (1+M) is the distance from the image to the first principal point of the lens, EFL (1+1/M) is the distance from the object to the second principal point of the lens and M is the magnification of the system expressed as the ratio of object height to image height.

Therefore, in order to decrease the total distance between the CRT and the screen, it is necessary to reduce the EFL, or alternatively stated, increase the field angle of the lens.

An effect of increasing the angular coverage of the lens as a result of decreasing the EFL is that the aberrations become more difficult to correct.

A further consideration is introduced wherein a spacing is provided between the phosphor screen of the CRT and the third lens unit of the projection lens. This spacing may be required for the inclusion of a liquid cooling and/or optical coupling material and a housing necessary to enclose the coolant against the face of the CRT. This additional spacing between the face of the CRT and the third lens unit causes the third lens unit to contribute more negative power, which must be compensated by increased power in the positive second lens unit. In some cases, the phosphor surface of the CRT is curved concave to increase the corner brightness. This permits a power reduction in the third group inasmuch as the power requirement for correction of field curvature is reduced.

A single biconvex element of the second lens unit, as shown in the aforementioned patents, does not provide the lens designer adequate degrees of freedom to correct for the chromatic aberration. By dividing the optical power of the second lens unit, as disclosed in U.S. Pat. No. 4,348,081, a better control of aberrations can be obtained for a shorter EFL. However, merely splitting the optical power of the second lens unit into two elements to obtain additional degrees of optical design freedom does not provide acceptable contrast and resolution where the angular coverage of the projection lenses is required to be in excess of twenty-seven degrees.

Since the advent of lenses, as shown in U.S. Pat. No. 4,300,817, which made large screen home projection television sets feasible, there have been continuing efforts to design projection lenses with wider field angles which are more compact and easier to manufacture at the greatest economy. This, of course, is an effort to reduce the cost of the lens and to reduce the depth of the housing of the television system while maintaining or increasing the size of the viewing screen.

Projection lenses of the overall type described hereinabove have been designed with decreased EFLs by designing a more complex second lens unit split into more than one lens element, as exemplified in the lenses disclosed in U.S. Pat. Nos. 4,697,892 and 4,707,684.

These designs are currently used on many wide screen projection television sets and may have an equivalent focal length as low as eighty millimeters. It will be understood that the EFL could be greater if there is a fold in the optical axis between the first and second lens units.

This approach works very well and leads to high quality optical performance of the lens. However, it requires large diameter positive elements in the second lens unit to accommodate the diverging bundle of light (as traced from the long conjugate). This construction also requires a lens of relatively long front vertex distance (FVD), largely due to a long space between the first negative element and the following power unit, which is necessary to achieve an appropriate correction of field curvature and astigmatism. The front vertex distance is the distance from the image side of the first lens unit to the face place of the CRT.

The related co-pending application discloses a lens of the type which consists of a first lens unit comprising a single element with two aspheric surfaces, and an overall positive meniscus shape preferably convex to the image end, a second lens unit having a positive element, and a third lens unit having a storingly negative surface concave to the image end. The first lens element is of positive optical power at the optical axis of the lens, but due to the aspheric power of the surfaces, the positive optical power decreases with distance from the optical axis and may become strongly negative at or closely adjacent the clear aperture of the first lens element, as hereinafter explained.

The strong negative power of the third lens unit contributes to correction of the Petzval sum of other lens elements. The strongly concave surface may be made aspheric to also correct for residual astigmatism and field curvature of the lens. The second lens element provides the majority of the positive power of the lens and some correction for astigmatism. The first lens element must then correct the aperture dependent aberrations, particularly, spherical aberration and coma aberration. Lenses as described in the related application are very compact, having the first and second lens units spaced more closely than heretofore. Lenses as described may have a field angle as great as 73° while comprising only three elements.

In lenses of the type described in U.S. Pat. No. 4,300,817, all the elements are made out of acrylic because of simplicity of manufacturing aspherical surface on plastic. However, the refractive index of acrylic varies significantly with temperature. This leads to a change in focal lengths of the acrylic lens elements, which in turn, can lead to defocus or lack of sharp focus of the overall lens.

One way of compensating for focus shift with temperature is to design a lens mount and lens barrel using a bi-metallic plate or other means that will shift the position of the lens relative to the CRT as a function of temperature in such a way that the focus of the lens will remain in a constant position. Alteratively, the second or power lens unit may be formed of glass, as disclosed in U.S. Pat. No. 4,348,081, which does not exhibit substantial change in index of refraction with temperature. However, this restricts the lens design in that it is very expensive to define an aspheric surface on glass. A further solution is to design a hybrid lens using a glass power unit with an additional acrylic corrector with one or more aspheric surfaces adjacent to the power unit. However, this does not necessarily provide a lens with a wide field angle and decreased length.

To reduce the cost of manufacturing projection lenses, it is desirable to decrease the size of the elements. In the present invention, a positive first lens unit is utilized to reduce the diameter of the other elements of the lens system. This is achieved through the use of a positive first lens unit preferably in the overall form of a meniscus which converges the rays toward the strongly positive second lens unit (as traced from the long conjugate side). The spacing between the first lens unit and the second lens unit is thereby reduced, which results in a reduction in the front vertex distance of the lens.

To resolve such problems, a conventional lens is well disclosed in U.S. Pat. No. 4,776,681.

Referring to FIG. 1, the conventional projection lens will now be explained.

As shown therein, the conventional projection lenses of the overall type have been designed with a plastic non-aspheric lens, and as shown in FIGS. 2A to 2C, the chromatic aberrations are not corrected.

The conventional projection lenses cannot perform optimum results because the lenses are designed in e-line (546.0 nm) which is a central wave of a green CRT and then the same lenses are used in the red and blue CRTs.

A central wavelength of the blue CRT (450 nm) and a central wavelength of the red CRT (612 nm) are so deviated from the e-line (546.0 nm), which is a central wavelength of a green CRT, so that the chromatic aberrations occur, as shown in FIG. 2A.

FIGS. 3A to 3C show spectrum characteristics which are obtained from the green, blue, and red CRTs.

Since all the CRTs have a part of different wavelength band width, respectively, the chromatic aberrations occur too.

The green lens assembly has the most effect on the display quality of a television. However, the spectrum of the green CRT as shown in FIG. 3A contains the blue and red lights besides the central wavelength, so that the compensation for the chromatic aberrations is required therein.

Generally, the optical system in which the compensation of the chromatic aberrations is not corrected, degrades the display quality and the contrast so that the compensation for the chromatic aberration is required in the high definition television and the high definition video projector.

In these drawings, the lens units are identified by the reference G followed by successive arabic numerals except that a corrector lens unit is designated by the reference CR; lens elements are identified by the reference L followed by successive arabic numerals from the image to the object end. Surfaces of the lens element are identified by the reference S followed by successive arabic numerals from the image to the object end. The reference Si denotes the screen of a cathode ray tube.

The first lens unit G1 comprises an element of positive power and an overall positive shaped meniscus and has at least one aspheric surface defined by the equation:

$$X = \frac{C_y^2}{1 + 1 - (1+K) * C_y^2} \ D_y^4 + E_y^6 + F_y^8 + G_y^{10} + H_y^{12} + I_y^{14}$$

where X is the surface sag at a semi-aperture distance y from the optical axis A of the lens, C is the curvature of a lens surface at the optical axis A equal to the reciprocal of the radius at the optical axis, K is a conic constant, and D, E, F, and G are aspheric coefficients.

The second lens unit G2 is biconvex and preferably consists of a single biconvex element having spherical surfaces, and is of a glass material to minimize the variation of refractive index with temperature.

The lens unit G3 acts as a field flattener, that is, it corrects Petzval curvature of the first and second lens units. The concave image side surface of the third lens unit G3 may be spherical or aspheric, as hereinafter set forth. As disclosed in U.S. Pat. No. 4,685,774, the spacing $D_{12}$ between the first element of lens unit G1 and lens unit G2 is important in aiding in the correction of field curvature. The spacing $D_{12}$ between the first and second lens units should be:

$$0.10 < |D_{12}/F_3| < 0.48$$

where $F_3$ is the equivalent focal length of the third lens unit.

If $|D_{12}/F_3|$ goes below 0.10, the field curvature becomes over-corrected and the image quality becomes unacceptable. If $|D_{12}/F_3|$ exceeds 0.48, the field curvature is under-corrected and the image quality is again not acceptable.

As one attempt to increase the field angle of the lens, more astigmatism is introduced. This may be corrected at the expense of correction of spherical aberration in the second lens unit G2.

The lens unit G1 corrects the spherical aberration introduced by the lens unit G2 as well as coma and some other off-axis aberrations.

This is achieved by providing element L1 with two aspheric surfaces S1 and S2, which define element L1 as having positive optical power at the optical axis which decreases with distance from the optical axis and may change to negative optical power, which becomes very strong at the limit of the clear aperture.

There is set forth the aspheric optical power $K_{CA}/K_A$ of the first lens element L1 of each prescription at or adjacent the clear aperture from the optical axis to the limit of the clear aperture or just adjacent the limit of the clear aperture. In each case the power at the optical axis is positive and decreases with height y and may become negative and then increase in negative power to an absolute value at least two and one-half times the optical power at the axis with one exception. These relationships exemplify the change in optical power of the lens element L1 from the optical axis to the limit of the clear aperture of the lens.

The optical power $K_y$ of a lens is calculated from the equation:

$$K_y = (n-1)(C_{1y} - C_{2y})$$

where n is the index of refraction of lens element L1, $C_{1y}$ is the curvature of the first lens surface at a height y from the optical axis A, and $C_{2y}$ is the curvature of the second lens surface at the height y from the optical axis.

SUMMARY OF THE INVENTION

Accordingly, it is an object of the present invention to provide a projection lens.

It is another object of the present invention to provide an improved projection lens capable of substantially and advantageously implementing a distinct picture by compensating for a chromatic aberration and a residual aberration.

To achieve these objects, there is provided an improved projection lens which includes a first lens group, including a lens element convex to a screen and having a relatively weak optical power for eliminating a spherical aberration; a second lens group of positive optical power composed of a positive element and a negative element cemented thereto, which have different dispersions from each other; a third lens group having a positive optical power on an optical axis, and having a meniscus shape concave to the screen around the optical axis and convex to the screen around the outer extent of the clear aperture in order to correct the coma aberration; and a fourth lens group having a concave surface and providing corrections for field-dependent aberrations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
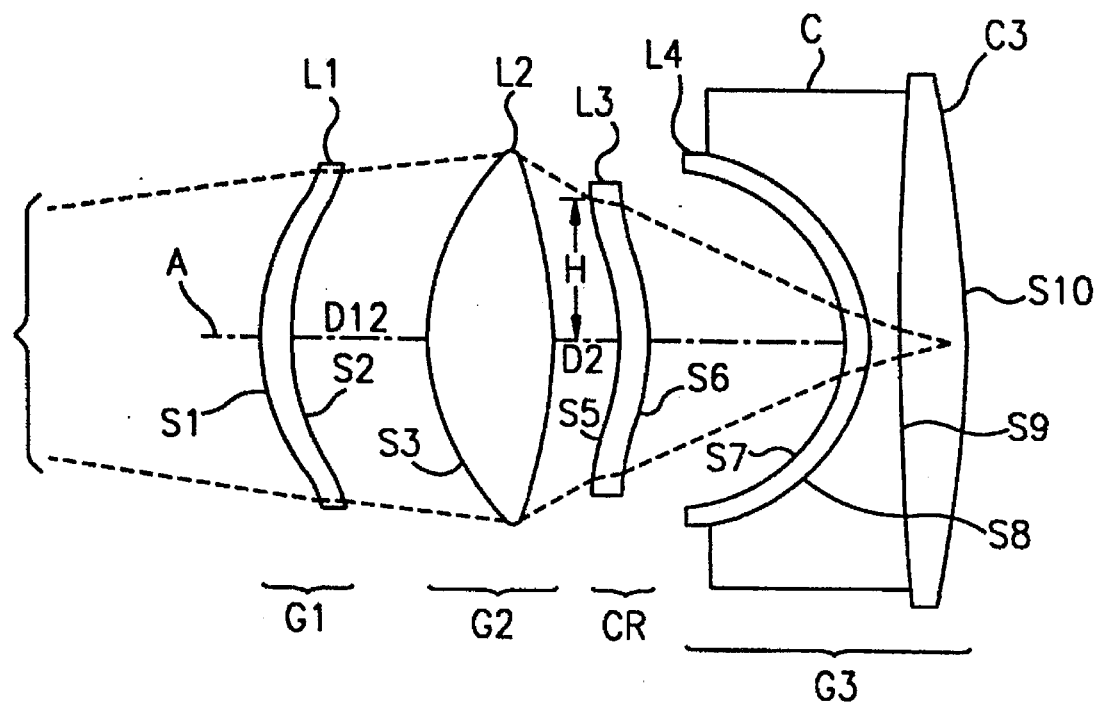
FIG. 1 is a side view showing a projection lens of which axial and off-axis rays are traced from a conventional conjugator.

Referring to FIGS. 4 through 9, there are shown side views of the projection lens according to the embodiments of the present invention.

As shown therein, the projection lens includes a first lens group 100 having a relatively weak positive power to eliminate the spherical aberration, a second lens group 101 of positive power composed of cementing a biconvex lens L2 and a concave lens L3, a third lens group 102 having a positive optical power at an optical axis and having a meniscus shape concave to a screen around the optical axis and convex to the screen around the outer extent of a clear aperture thereof, and a fourth lens group 103.

The lens elements are provided by serial reference numerals L1 to L5 in the order of the object from the image.

The surfaces of the first through fifth lens elements L1 through L5 are provided by serial reference numerals S1 through S11 and Si.

In addition, in the drawings, "Stop" denotes an iris located between the first lens group 100 and the second lens group 101 and "C" denotes a coolant. As described above, the lens system embodying the present invention comprises four lens groups composed of 5 lenses so that the projection lens can secure a good performance such as due to a large screen, good image, imaging quality, a compact display set, and an athemalized system. That is, in order to have a bright system, F/number of lens should be less so that the diameter of the lens increases.

Figure 4:
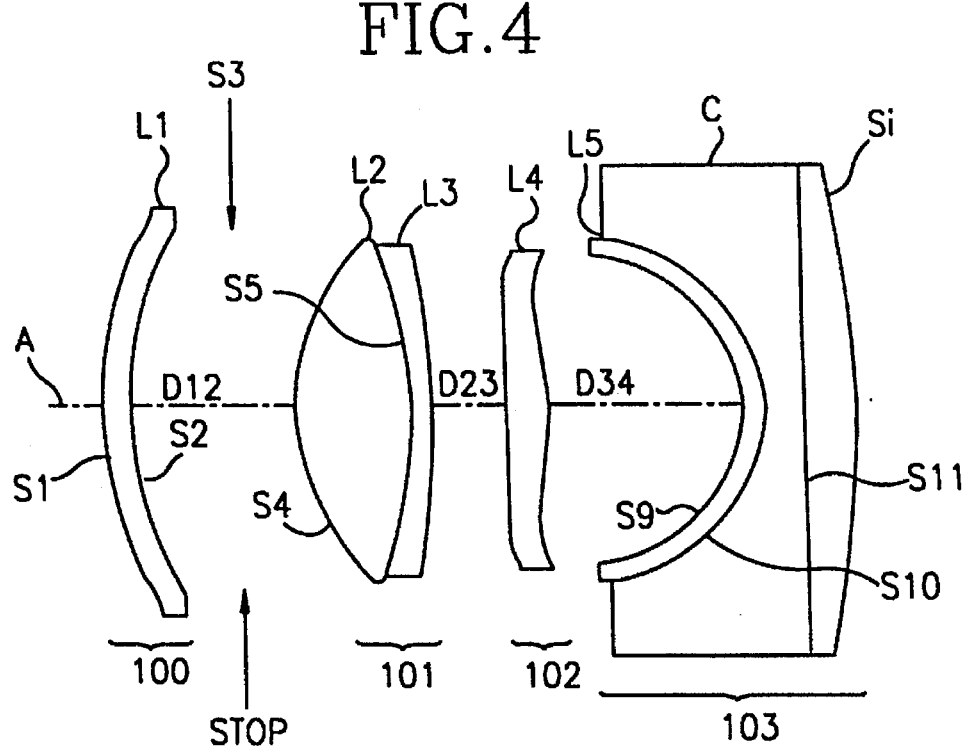
FIG. 4 is a side view showing a projection lens of a first embodiment according to the present invention.
Figure 5:
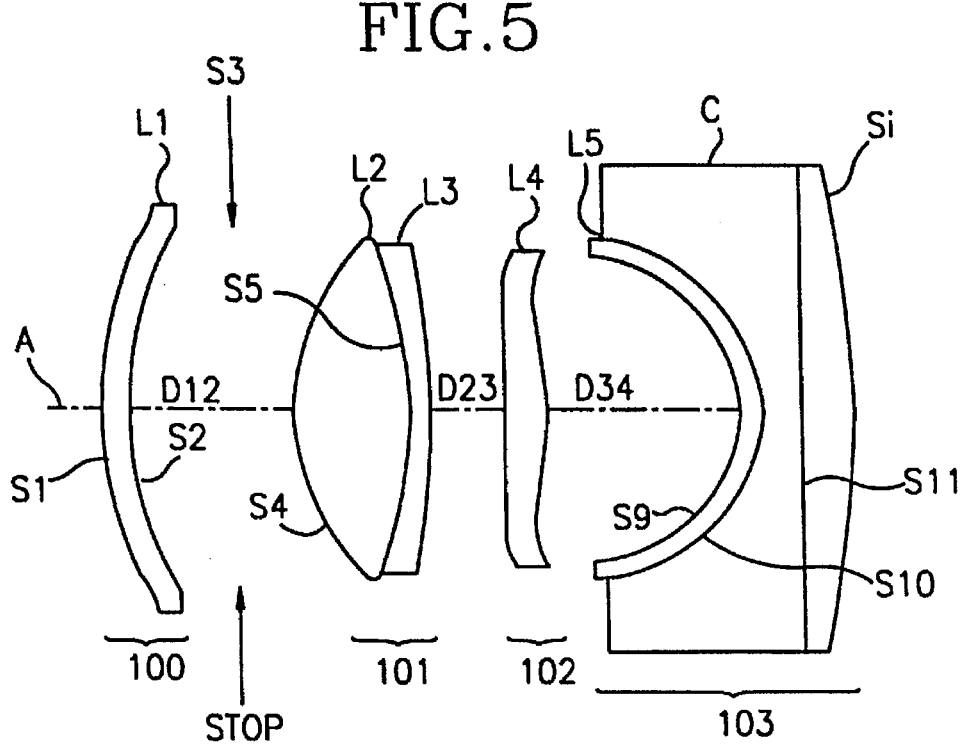
FIG. 5 is a side view showing a projection lens of a second embodiment according to the present invention.

Accordingly, since the spherical aberration increases, the aspherical lens element L1 having a meniscus shaped in the same way as the first lens group 100 shown in FIG. 4, is required to correct such spherical aberration.

In addition, the projection lens requires a lens element having a big magnification ratio in order to minimize the focus shift in accordance with the temperature changes, so that the lens should be a biconvex lens and made of glass.

The projection lens embodying the present invention makes a large amount of field dependent aberrations including distortion aberrations since the size of the high definition set is decreased, so that the lens element L5 concave to screen, as shown in FIG. 4, is advantageously provided. In addition, it is more effective to provide aspheric surface S9 on such lens and to provide a proper curvature on the phosphor surface Si of the CRTR.

However, since it is still difficult to correct for the coma aberration and residual aberration and to enhance the corner illumination using the fourth lens group 103 only, as shown in FIG. 4, the third lens group 102 provided between the second lens group 101 and the fourth lens group 103 is required to overcome such problems.

To begin with, it is very effective to minimize the Petzval sum $P_{G3}$ of the third lens group 102 which is given below in order to reduce the field curvature which is not substantially corrected at the fourth lens group 103.

$$P_{G3} = K_{G3}/N_{G3} \quad (1)$$
$$= \{C_7 (N_{G3} - 1) + C_8 (1 - N_{G3})\}/N_{G3}$$
$$= \{(N_{G3} - 1)/N_{G3}\} (C_7 - C_8) \quad (2)$$

where $P_{G3}$ is the Petzval sum of the third lens group 102, $K_{G3}$ is the optical power of the third lens group 102, $K_{G3}$ is the refractive index of the fourth lens element L4 of the third lens group 102, $C_7$ is the curvature of the surface of the screen side of the fourth lens element L4 of the third lens group 102, and $C_8$ is the curvature of the surface of the CRT side of the fourth lens element L4 of the third lens group 102.

Accordingly, as known in the formula (2), the curvature of both surfaces S7 and S8 of the fourth lens element L4 should have the same sign value in order to minimize the Petzval sum of the third lens group 102. In particular, the sign of the curvature at the optical axis should be a minus, so that the concave shape thereof is provided toward the screen.

In addition, the shape of the third lens group 102 should be convex to the screen adjacent to the outer extent of the clear aperture (that is, the end portion of the fourth lens element L4) so that upper rays are hardly cut, thereby delivering the rays on the corner portion of the phosphor surface Si of the CRT.

In addition, it is not preferable to use the plastic lens as a power lens therein because changes in the refractive index due to the temperature variation is 100 times those of the glass.

Accordingly, the optical power of the plastic lens should be small so that the performance of the projection lens can be substantially obtained by adapting the aspheric surface which is good for the aberration correction.

Referring to FIGS. 4 through 9, the second lens group 101 embodying the present invention is cemented with a pair of glass lenses.

Here, the reason why the second lens group 101 is formed with the cemented lenses is as follows.

Figure 3A:
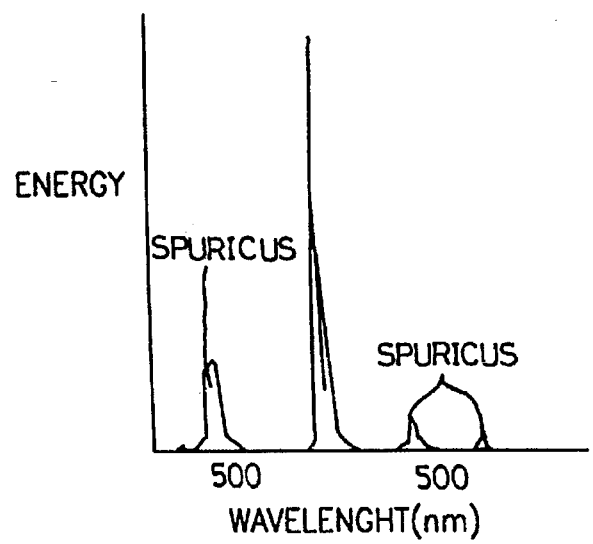
FIG. 3A is a characteristic diagram showing an emission spectrum of a green CRT phosphor surface.

Generally, the imaging quality of the projection TV is mainly affected by the green CRT-lens assembly. However, referring to FIG. 3A showing the inspection of the spectrum characteristics of the green CRT, the red and blue lights concurrently come out beside the central wavelength which is referred to the green, so that the chromatic aberrations occur due to another color of the green CRT, as shown in FIG. 3A.

The chromatic aberration acts as a factor for decreasing the resolution of the lens and for reducing the contrast, so that it is not good for the optical system for the quality display and high definition television.

The present invention provides a biconvex lens for cementing with a concave lens in the second lens group 101.

The cemented lenses of the second lens group 101 include a second lens element L2 having a convex shape with a little dispersion (a large Abbe number) and a third lens element L3 having a concave shape with a large dispersion (a small Abbe number), which is effective for correcting for the chromatic aberration of the optical system.

Figure 3B:
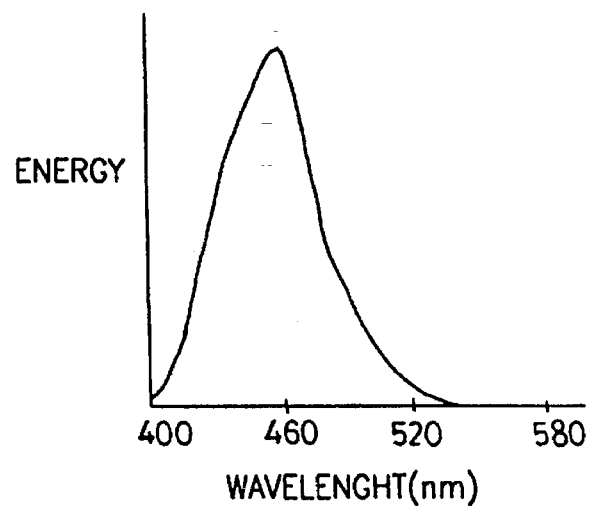
FIG. 3B is a characteristic diagram showing an emission spectrum of a blue CRT phosphor surface.
Figure 3C:
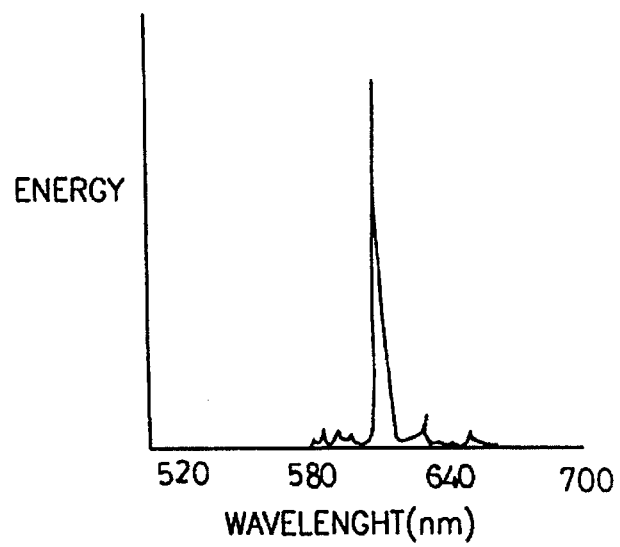
FIG. 3C is a characteristic diagram showing an emission spectrum of a red CRT phosphor surface.

The spectrum of the phosphor surface Si of the red CRT, as shown in FIG. 3C, has a strong color characteristic because the width of the wavelength is narrow, so that the chromatic aberration is not serious. As shown in FIG. 3B, since the spectrum of the blue CRT is spread over the wide region of the wavelength, compensation of the chromatic aberrations is required.

The weights for the color emanated from the green CRT and adapted in the lens according to the present invention are as follows.

| wavelength (nm) | weight |
|---|---|
| 590 nm | 6 |
| 546 nm | 80 |
| 450 nm | 14 |

Referring to FIGS. 10A through 15C, there are shown aberrations of the lens shown in FIGS. 4 through 9 according to the present invention designed by adapting such concepts.

In addition, examples of the embodiments according to the present invention are shown in the following tables.

TABLE I

Figure 10A:
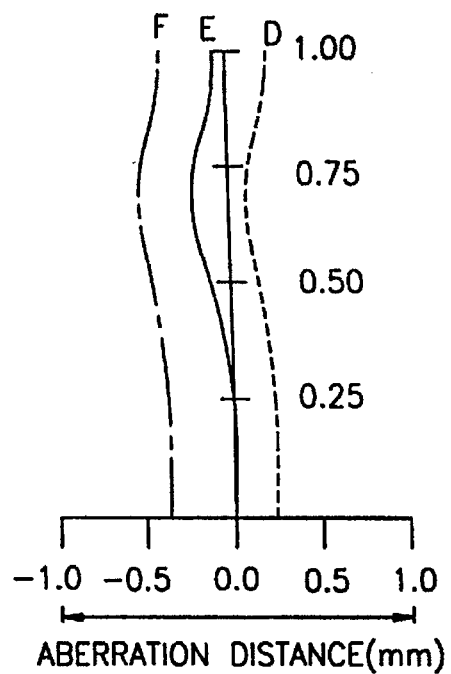
FIG. 10A is a characteristic diagram showing a spheric aberration of the projection lens shown in FIG.
Figure 10B:
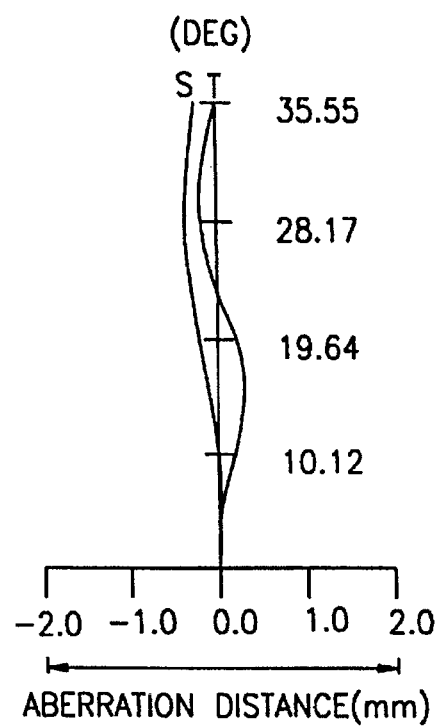
FIG. 10B is a characteristic diagram showing a field curvature of the projection lens shown in FIG. 4.
Figure 10C:
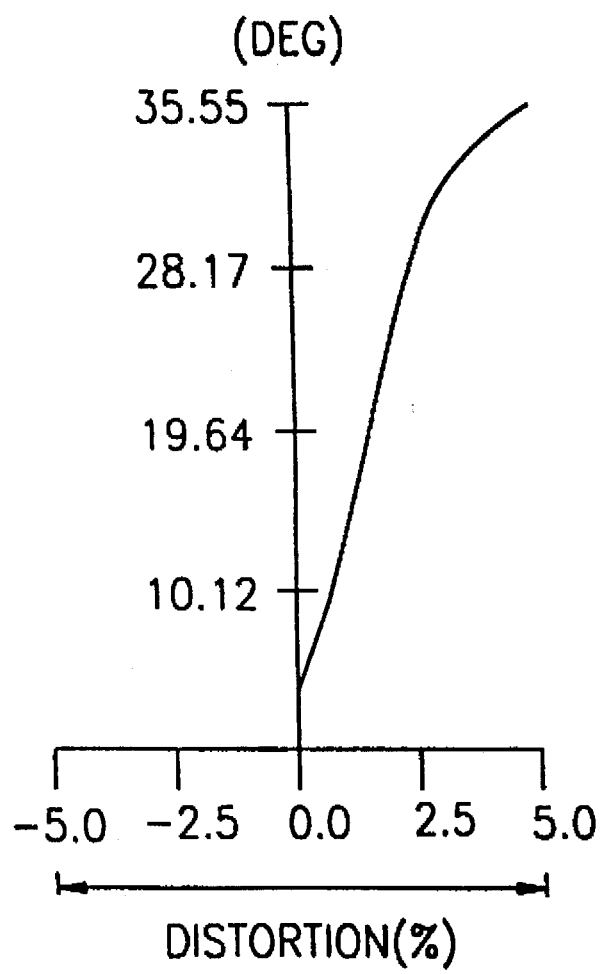
FIG. 10C is a characteristic diagram showing a distortion of the projection lens shown in FIG. 4.
Figure 11A:
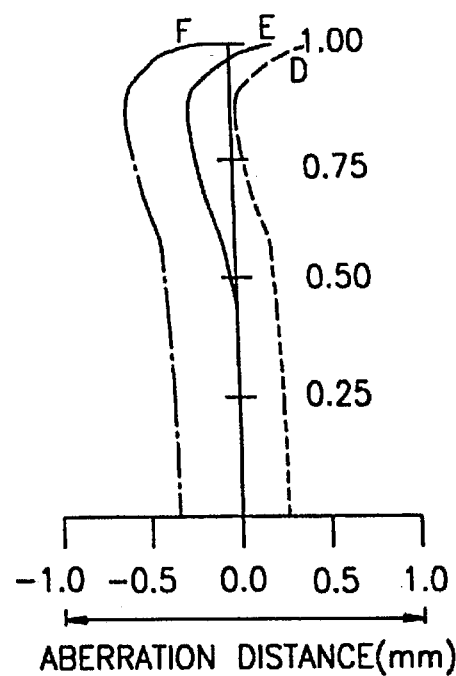
FIG. 11A is a characteristic diagram showing a spheric aberration of the projection lens shown in FIG. 5.
Figure 11B:
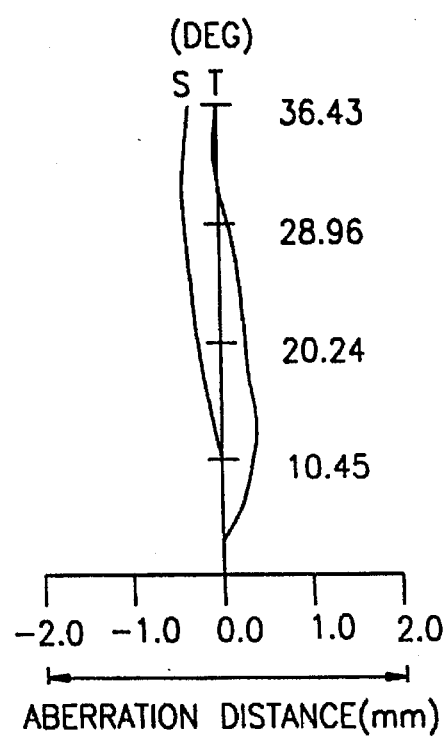
FIG. 11B is a characteristic diagram showing a field curvature of the projection lens shown in FIG. 5.
Figure 11C:
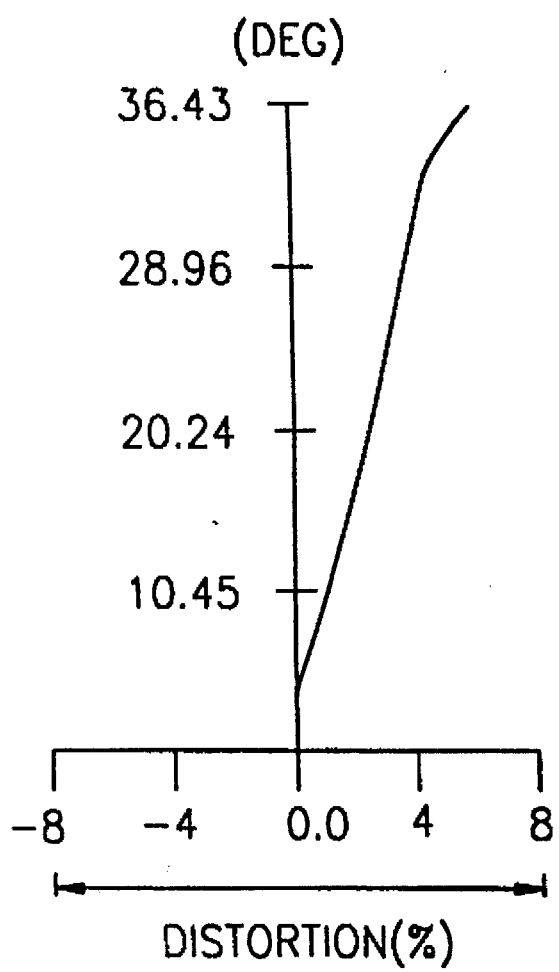
FIG. 11C is a characteristic diagram showing a distortion of the projection lens shown in FIG. 5.

The first embodiment (FIGS. 4 and 10).

| No | Radius | Thickness | Refractive Index (Nd) | Abbe No. (Vd) |
|---|---|---|---|---|
| OBJ | infinity | 1148.440 | | |
| S1: | 79.70009 | 6.000 | 1.4915 | 57.9 |
| S2: | 100.57599 | 18.790 | | |
| S3: | infinity | 17.000 | | |
| S4: | 71.17807 | 23.029 | 1.6031 | 60.7 |
| S5: | −90.8269.9 | 4.000 | 1.7552 | 27.5 |
| S6: | −161.40410 | 14.365 | | |
| S7: | −960.38209 | 7.059 | 1.4915 | 57.9 |
| S8: | −155.87479 | 34.000 | | |
| S9: | −46.18203 | 3.300 | 1.50 | 52.0 |
| S10: | −49.0167G | 8.000 | 1.435 | |
| S11: | infinity | 13.000 | 1.563 | |
| IMG | −350.00000 | −0.000 | | |

Aspherical surface coefficients for aspherical surfaces:

| No. | K | A | B | C | D |
|---|---|---|---|---|---|
| S1: | −1.14278 | −0.12928E-06 | −0.42533E-09 | 0.15913E-13 | 0.22409E-16 |
| S2: | 3.03468 | −0.22978E-06 | −0.52783E-09 | 0.12357E-12 | −0.21059E-16 |
| S7: | 0.00000 | 0.32759E-06 | 0.43299E-09 | 0.49903E-12 | −0.33180E-15 |
| S8: | 12.78419 | 0.18182E-05 | 0.21562E-09 | 0.11299E-11 | −0.44354E-15 |
| S9: | 0.31670 | −0.17305E-05 | 0.2516E-08 | −0.16231E-11 | 0.54321E-15 |

TABLE II

The second embodiment (FIGS. 4 and 10)

| No | Radius | Thickness | Refractive Index (Nd) | Abbe No. (Vd) |
|---|---|---|---|---|
| OBJ | infinity | 1111.736 | | |
| S1: | −76.41966 | 6.335 | 1.4915 | 57.9 |
| S2: | 95.9440 | 18.090 | | |
| S3: | infinity | 15.000 | | |
| S4: | 67.49192 | 24.342 | 1.6031 | 6− |
| S5: | −87.33557 | 3620 | 1.7552 | 27.5 |
| S6: | −163.49488 | 11.270 | | |
| S7: | −708.77108 | 6.596 | 1.4915 | 57.9 |
| S8: | −134.91412 | 33.000 | | |
| S9: | −46.45925 | 3.172 | 1.50 | 52.0 |
| S10: | −47.13150 | 9.000 | 1.435 | |
| S11: | infinity | 13.000 | 1.563 | |
| IMG | −350.00000 | −0.000 | | |

Aspherical surface coefficients for aspherical surfaces:

| No. | K | A | B | C | D |
|---|---|---|---|---|---|
| S1: | −1.11598 | −0.13182E-06 | −0.49380E-09 | 0.47255E-13 | 0.18457E-16 |
| S2: | 2.87012 | −0.23375E-06 | −0.61698E-09 | 0.18039E-12 | −0.34885E-16 |
| S7: | 0.00000 | 0.41461E-06 | 0.69743E-09 | 0.11311E-11 | −0.66790E-15 |
| S8: | 10.98191 | 0.21471E-05 | 0.44243E-09 | 0.18415E-11 | −0.66770E-15 |
| S9: | 0.48931 | −0.27490E-05 | 0.34343-08 | −0.24653E-11 | 0.87469E-15 |

TABLE III

Figure 6:
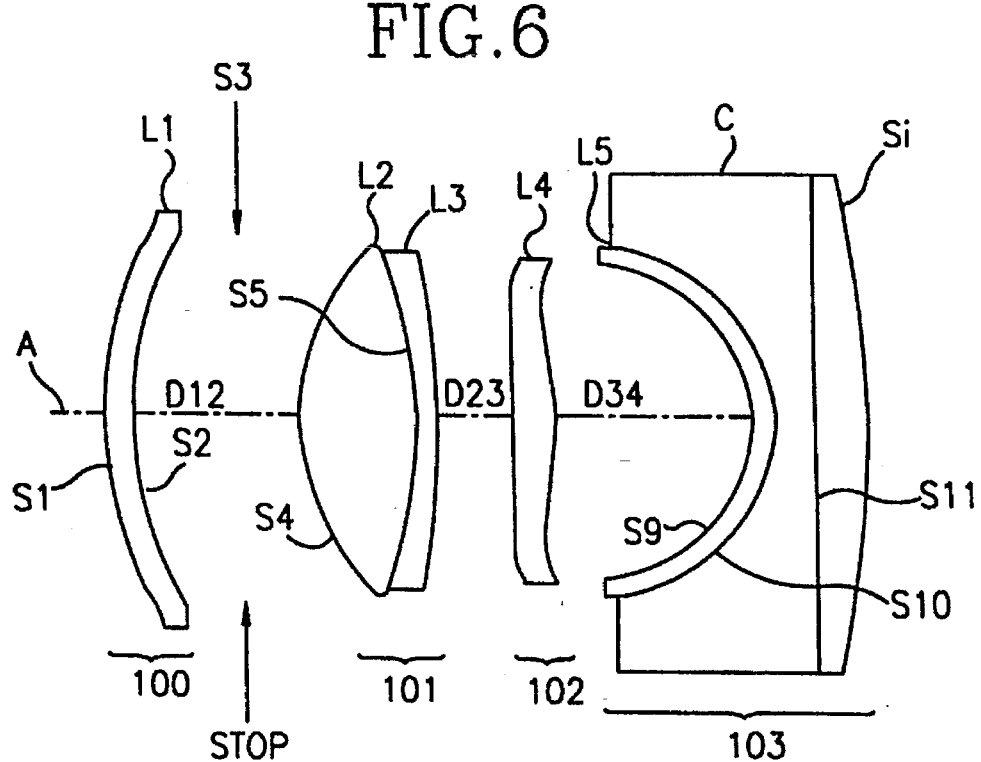
FIG. 6 is a side view showing a projection lens of a third embodiment according to the present invention.
Figure 12A:
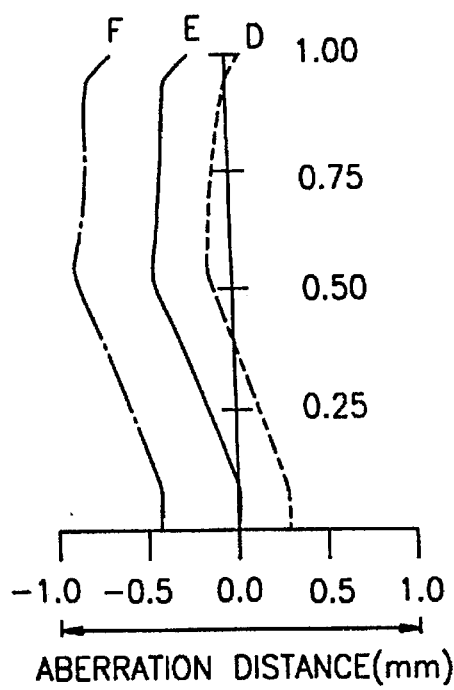
FIG. 12A is a characteristic diagram showing a spheric surface aberration of the projection lens shown in FIG. 6.
Figure 12B:
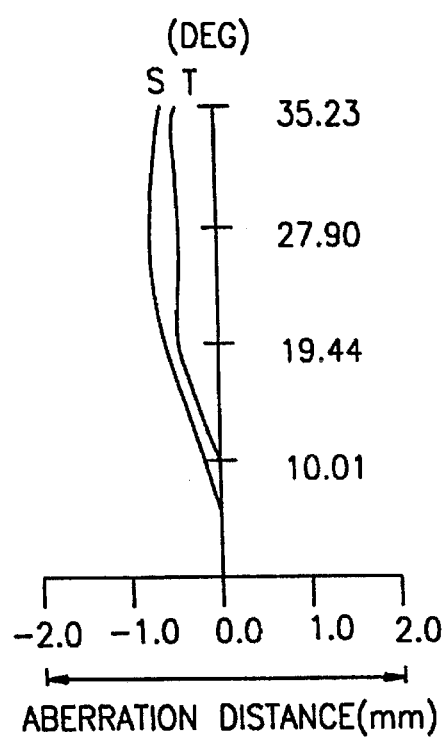
FIG. 12B is a characteristic diagram showing a field curvature of the projection lens shown in FIG. 6.
Figure 12C:
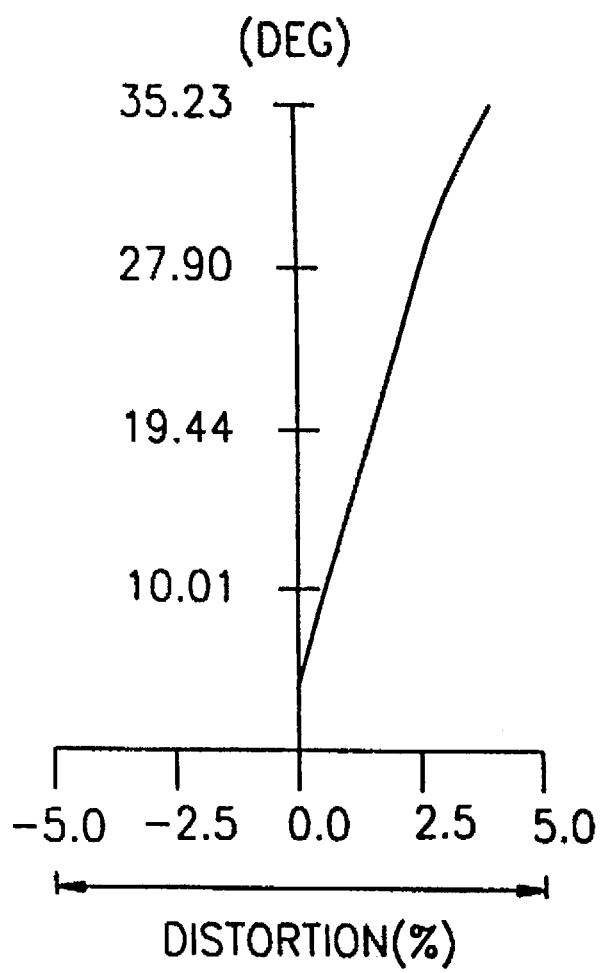
FIG. 12C is a characteristic diagram showing a distortion of the projection lens shown in FIG. 6.

The third embodiment (FIGS. 6 and 12)

| No | Radius | Thickness | Refractive Index (Nd) | Abbe No. (Vd) |
|---|---|---|---|---|
| OBJ | infinity | 1169.692 | | |
| S1: | 79.18792 | 6.919 | 1.4915 | 57.9 |
| S2: | 102.63401 | 18.003 | | |
| S3: | infinity | 9.835 | | |
| S4: | 76.29694 | 24.710 | 1.6031 | 60.7 |
| S5: | −95.00000 | 3.696 | 1.7552 | 27.5 |
| S6: | −148.79710 | 11.403 | | |
| S7: | −515.69609 | 8.000 | 1.4915 | 57.9 |
| S8: | −135.64498 | 35.231 | | |
| S9: | −46.00000 | 3.500 | 1.50 | 52.0 |
| S10: | −48.00000 | 8.500 | 1.435 | |
| S11: | infinity | 13.000 | 1.563 | |
| IMG | −350.00000 | −0.000 | | |

Aspherical surface coefficients for aspherical surfaces:

| No. | K | A | B | C | D |
|---|---|---|---|---|---|
| S1: | −1.76552 | −0.25838E-06 | −0.53692E-09 | 0.50686E-13 | 0.23590E-16 |
| S2: | 3.23072 | −0.59592E-06 | −0.39291E-09 | 0.33002E-13 | −0.13657E-16 |
| S7: | 0.00000 | 0.81697E-06 | 0.43593E-09 | 0.68366E-13 | −0.30977E-15 |
| S8: | 10.00000 | 0.19989E-05 | 0.56185E-09 | 0.91827E-12 | −0.22630E-15 |
| S9: | 0.31133 | −0.22247E-05 | 0.26218E-08 | −0.02841E-11 | 0.76461E-15 |

TABLE IV

Figure 7:
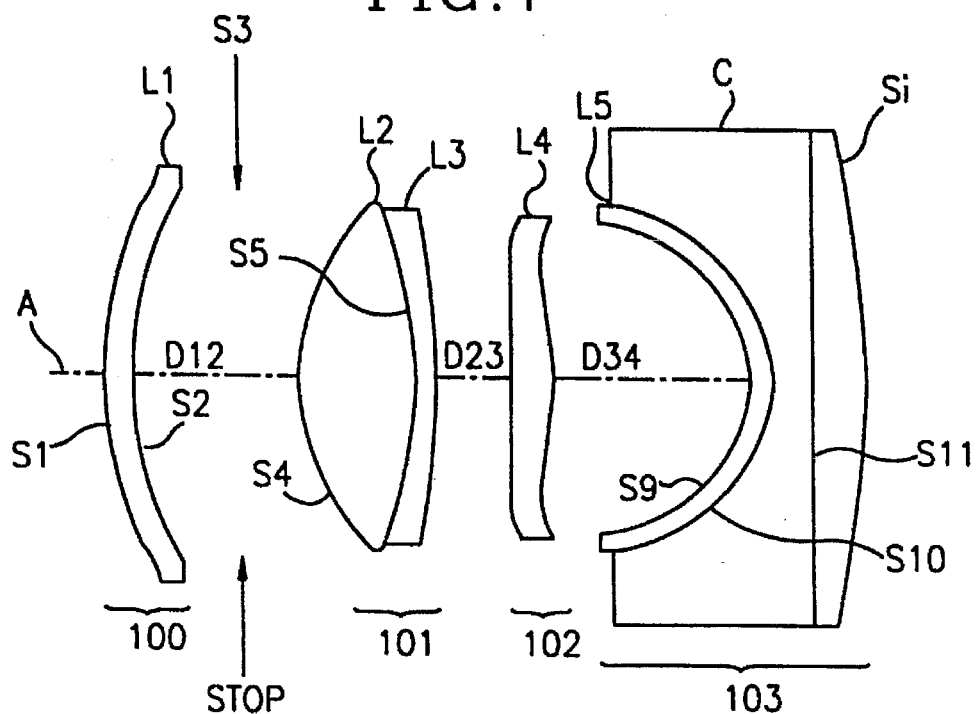
FIG. 7 is a side view showing a projection lens of a fourth embodiment according to the present invention.
Figure 13A:
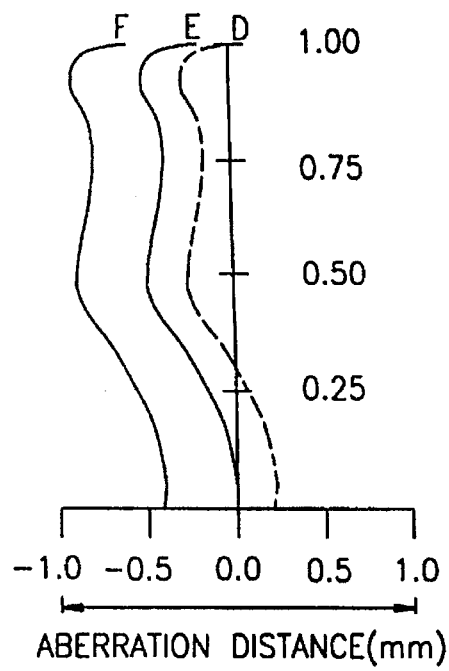
FIG. 13A is a characteristic diagram showing a spherical surface aberration of the projection lens shown in FIG. 7.
Figure 13B:
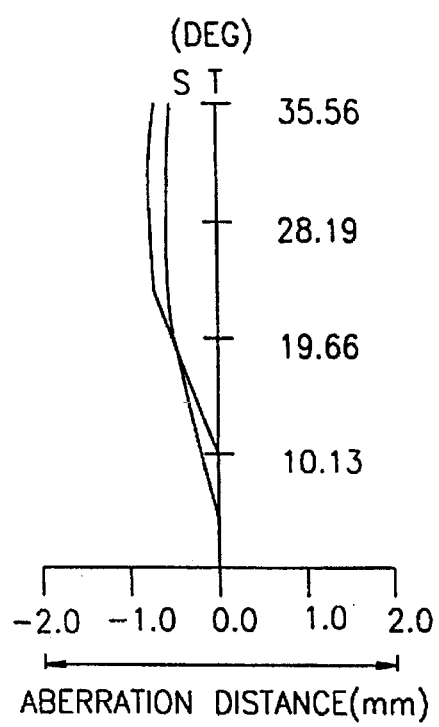
FIG. 13B is a characteristic diagram showing a field curvature of the projection lens shown in FIG. 7.
Figure 13C:
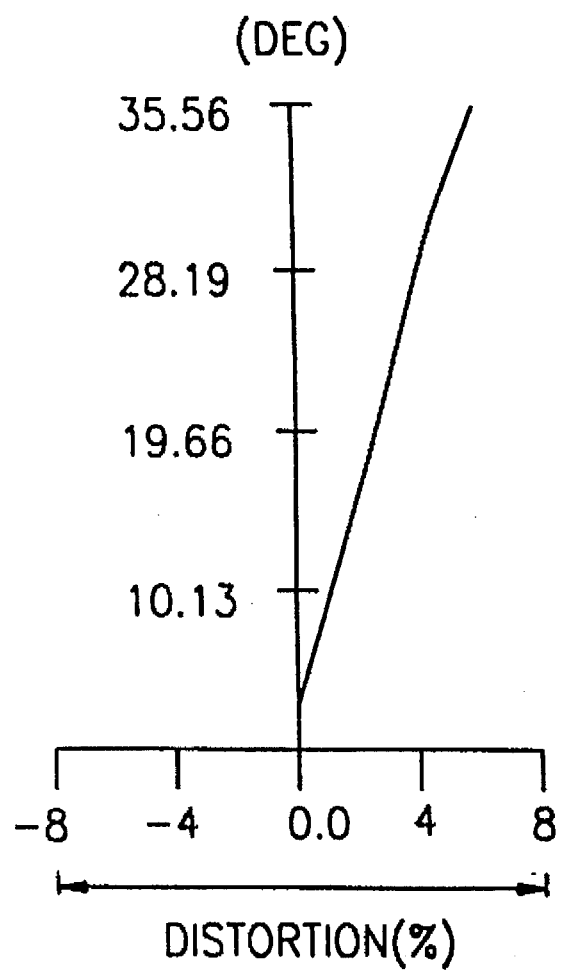
FIG. 13C is a characteristic diagram showing a field curvature of the projection lens shown in FIG. 7.

The fourth embodiment (FIGS. 7 and 13)

| No | Radius | Thickness | Refractive Index (Nd) | Abbe No. (Vd) |
|---|---|---|---|---|
| OBJ | infinity | 1154.867 | | |
| S1: | 84.71609 | 6.500 | 1.4915 | 4,71 |
| S2: | 115.08340 | 28.394 | | |
| S3: | infinity | 0.000 | | |
| S4: | 75.40076 | 24.667 | 1.6031 | 60.7 |
| S5: | −95.00000 | 4.000 | 1.7552 | 27.5 |
| S6: | −142.25017 | 10.003 | | |
| S7: | −607.90200 | 8.000 | 1.4915 | 57.9 |
| S8: | −140.29061 | 35.793 | | |
| S9: | −46.00000 | 3.300 | 1.50 | 52.0 |
| S10: | −47.00000 | 8.500 | 1.435 | |
| S11: | infinity | 13.000 | 1.56 | |
| IMG | −350.00000 | −0.380 | | |

Aspherical surface coefficients for aspherical surfaces:

| No. | K | A | B | C | D |
|---|---|---|---|---|---|
| S1: | −2.33488 | −0.38824E-06 | −0.42414E-09 | 0.92575E-13 | 0.48685E-17 |
| S2: | −2.85528 | −0.19524E-06 | −0.41075E-10 | −0.95711E-13 | −0.68474E-16 |
| S7: | 0.00000 | 0.10641E-05 | 0.11185E-09 | 0.12053E-11 | −0.49461E-15 |
| S8: | 11.57219 | 0.21441E-05 | 0.25702E-09 | 0.11626E-11 | −0.30104E-15 |
| S9: | 0.37569 | −0.28034E-05 | 0.26936E-08 | −0.19955E-11 | 0.74996E-15 |

TABLE V

Figure 8:
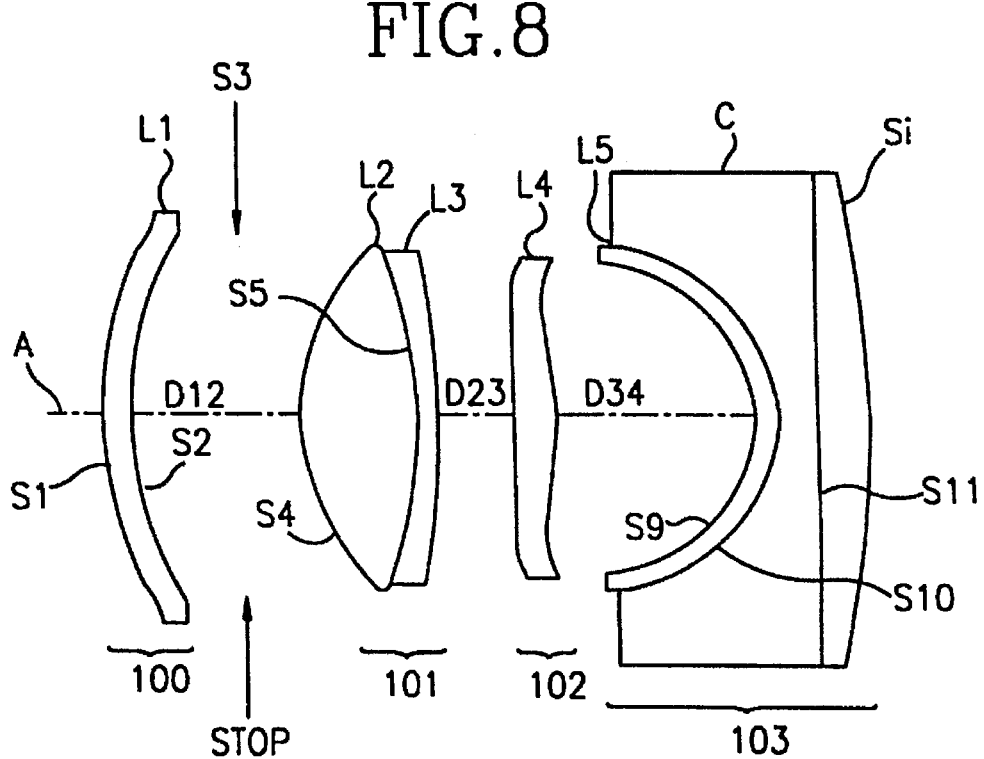
FIG. 8 is a side view showing a projection lens of a fifth embodiment according to the present invention.
Figure 14A:
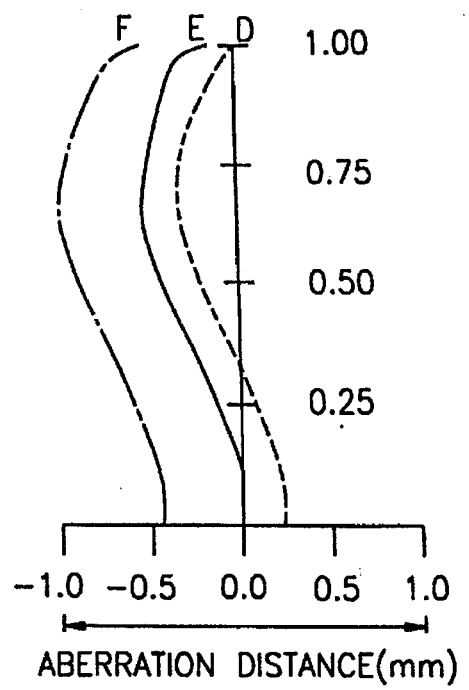
FIG. 14A is a characteristic diagram showing a spheric surface aberration of the projection lens shown in FIG. 8.
Figure 14B:
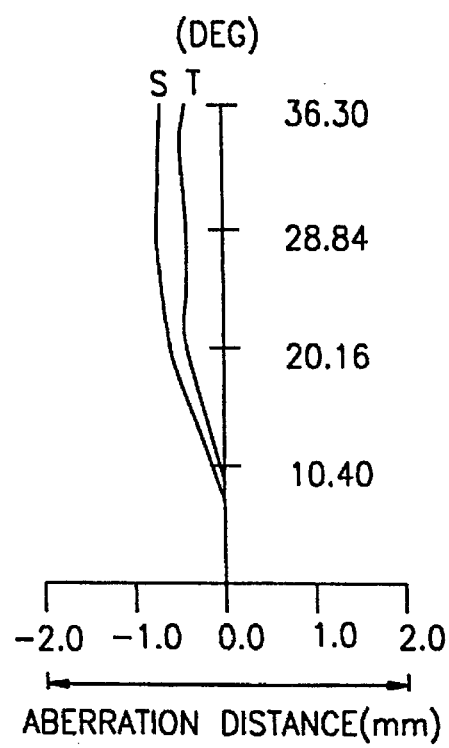
FIG. 14B is a characteristic diagram showing a field of the projection lens shown in FIG. 8.
Figure 14C:
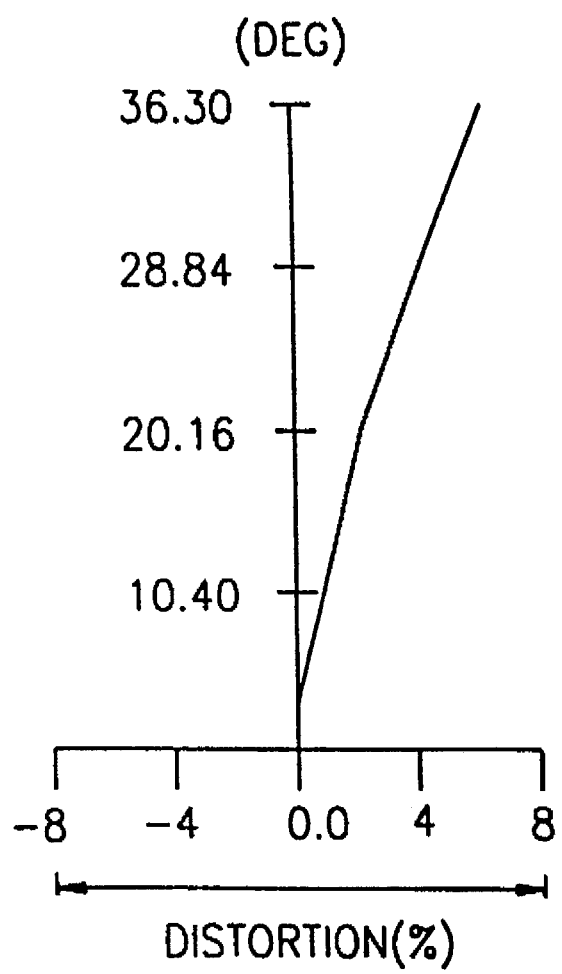
FIG. 14C is a characteristic diagram showing a distortion of the projection lens shown in FIG. 8.

The fifth embodiment (FIGS. 8 and 14)

| No | Radius | Thickness | Refractive Index (Nd) | Abbe No. (Vd) |
|---|---|---|---|---|
| OBJ | infinity | 1165.190 | | |
| S1: | 79.55170 | 6.300 | 1.4915 | 57.9 |
| S2: | 105.27984 | 20.172 | | |

TABLE V-continued

The fifth embodiment (FIGS. 8 and 14)

| | | | | |
|---|---|---|---|---|
| S3: | infinity | 0.000 | | |
| S4: | 71.00000 | 25.888 | 1.6030 | 60.7 |
| S5: | −95.00000 | 3.600 | 1.81965 | 22.5 |
| S6: | −154.15415 | 11.132 | | |
| S7: | −389.26313 | 7.422 | 1.4915 | 57.9 |
| S8: | −129.66159 | 34.146 | | |
| S9: | −45.00000 | 3.300 | 1.5000 | 52.0 |
| S10: | −48.00000 | 8.500 | 1.435 | |
| S11: | infinity | 13.000 | 1.563 | |
| IMG | −350.00000 | −0.350 | | |

Aspherical surface coefficients for aspherical surfaces:

| No. | K | A | B | C | D |
|---|---|---|---|---|---|
| S1: | −1.35068 | −0.18379E-06 | −0.47515E-09 | 0.64348E-13 | 0.15099E-16 |
| S2: | 3.28379 | −0.41059E-06 | −0.39179E-09 | 0.67282E-13 | 0.46370E-17 |
| S7: | −9.75709 | 0.64591E-06 | 0.17801E-10 | 0.11137E-11 | −0.54687E-15 |
| S8: | 10.06411 | 0.19537E-05 | 0.65521E-09 | 0.84533E-12 | −0.22590E-15 |
| S9: | 0.31927 | −0.19883E-05 | 0.24170-08 | −0.16435E-11 | 0.63355E-15 |

TABLE VI

Figure 9:
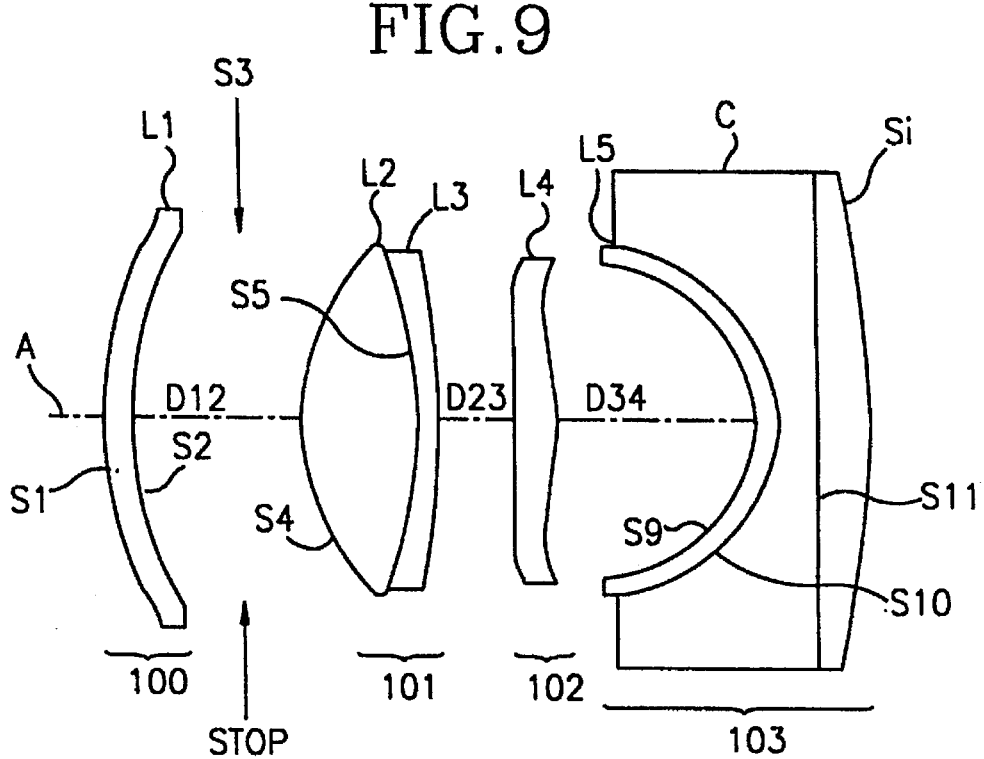
FIG. 9 is a side view showing a projection lens of a sixth embodiment according to the present invention.

The sixth embodiment (FIGS. 9 and 15)

| No | Radius | Thickness | Refractive Index (Nd) | Abbe No. (Vd) |
|---|---|---|---|---|
| OBJ | infinity | 832.730 | | |
| S1: | 78.57000 | 6.300 | 1.4915 | 57.9 |
| S2: | 101.79000 | 20.818 | | |
| S3: | infinity | 0.000 | | |
| S4: | 69.13985 | 24.522 | 1.6031 | |
| S5: | −90.00000 | 4.000 | 1.6889 | 31.2 |
| S6: | −174.41387 | 11.384 | | |
| S7: | −449.98684 | 7.832 | 1.4915 | 57.9 |
| S8: | −132.11453 | 34.736 | | |
| S9: | −46.00000 | 3.500 | 1.500 | 52.0 |
| S10: | −48.00000 | 8.500 | 1.535 | |
| S11: | infinity | 13.000 | 1.563 | |
| IMG | −350.00000 | −0.356 | | |

Aspherical surface coefficients for aspherical surfaces:

| No. | K | A | B | C | D |
|---|---|---|---|---|---|
| S1: | −1.35000 | −0.18600E-06 | −0.48000E-09 | 0.49600E-13 | 0.19400E-16 |
| S2: | 2.98600 | −0.42500E-06 | −0.41700E-09 | 0.59200E-13 | 0.55800E-17 |
| S7: | 0.00000 | 0.38571E-06 | 0.36492E-09 | 0.12321E-11 | −0.54861E-15 |
| S8: | 10.03041 | 0.19339E-05 | 0.87626E-10 | 0.13290E-11 | −0.37737E-15 |
| S9: | 0.36900 | −0.24200E-05 | 0.32500E-08 | −0.24400E-11 | 0.87000E-15 |

Figure 15A:
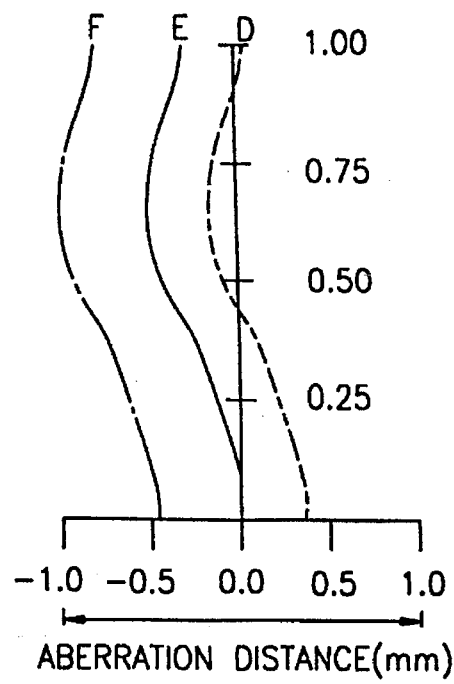
FIG. 15A is a characteristic diagram showing a spheric aberration of the projection lens shown in FIG. 9.
Figure 15B:
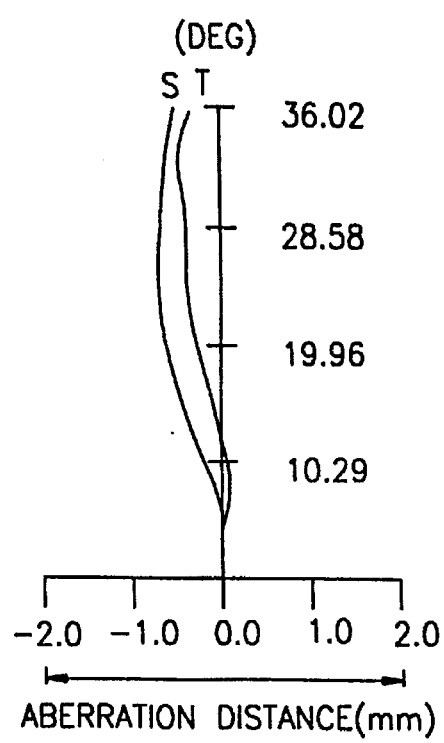
FIG. 15B is a characteristic diagram showing a field curvature of the project lens shown in FIG. 9.
Figure 15C:
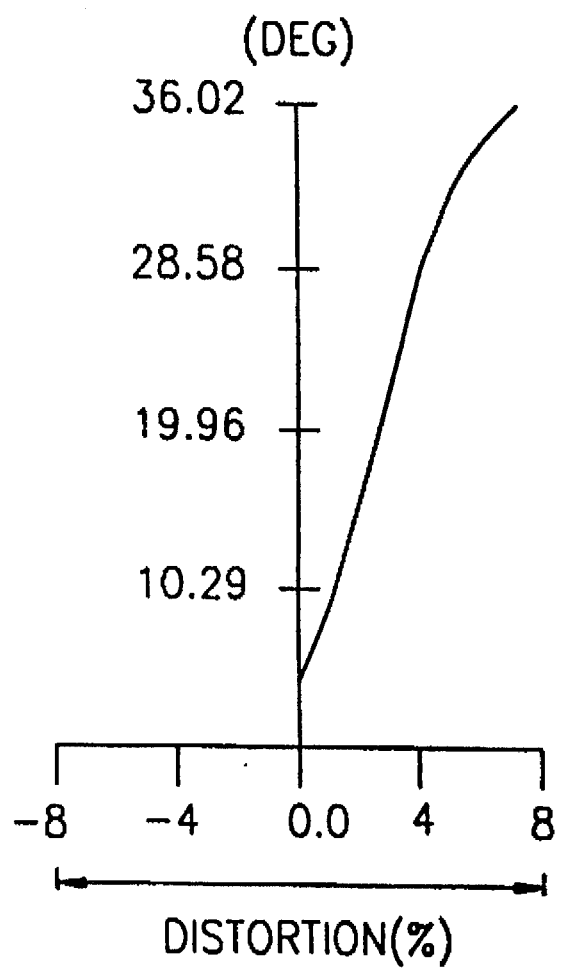
FIG. 15C is a characteristic diagram showing a distortion of the projection lens shown in FIG. 9.

As shown in FIGS. 15A through 15C, the spherical aberration, aspherical aberration and chromatic aberration are relatively corrected in comparison with the conventional art.

Figure 16:
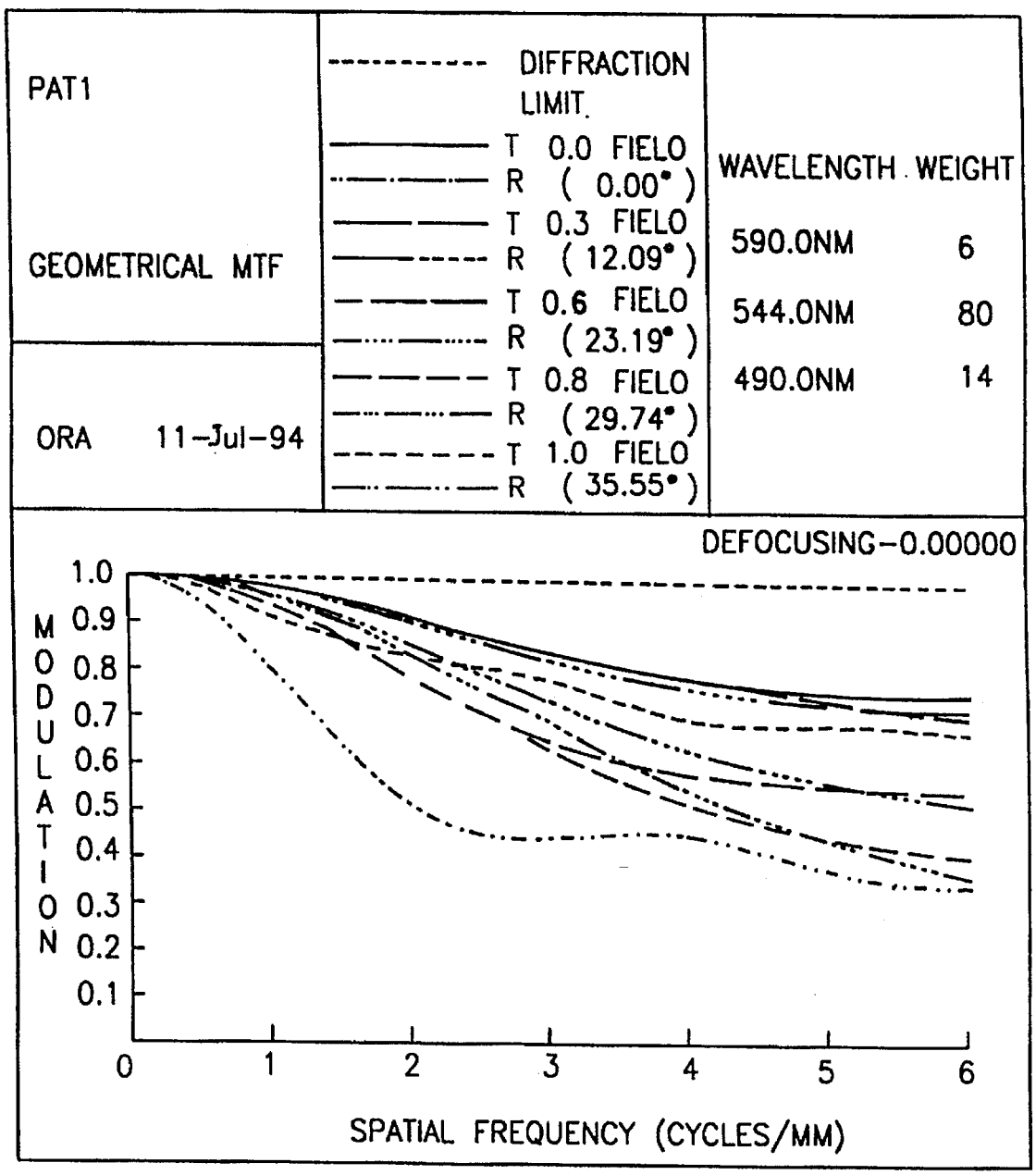
FIG. 16 is a characteristic diagram showing a modulation transfer function of the projection lens shown in FIG. 4.
Figure 17:
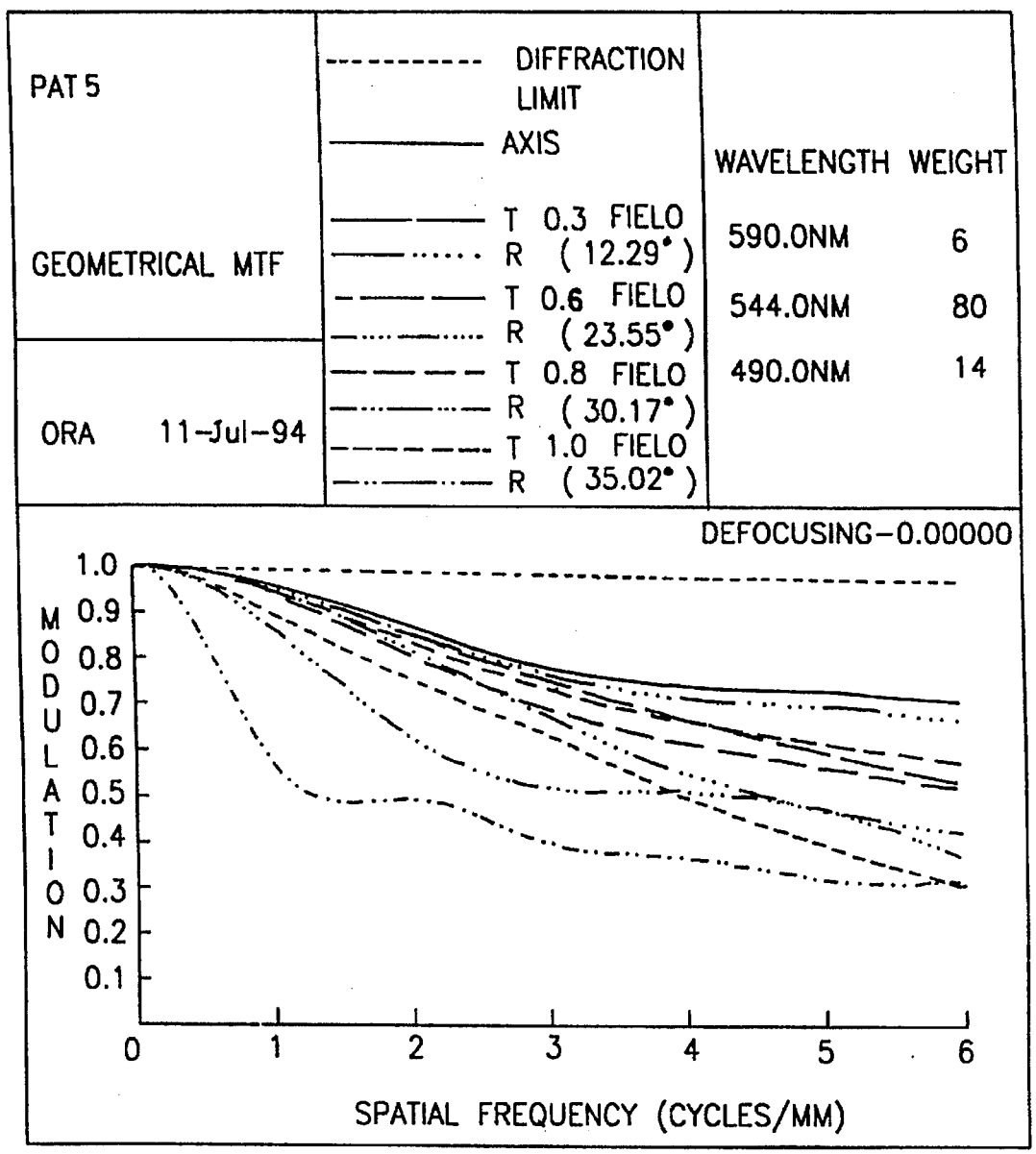
FIG. 17 is a characteristic diagram showing a modulation transfer function of the projection shown in FIG. 9.

Referring to FIGS. 16 and 17, there are shown MTF characteristics of FIG. 4 (table I) and FIG. 9 (table VI).

All of the lenses have enough MTF value at spatial frequency of 61 p/mm. Here, when the spatial frequency 61 p/mm is computed as a horizontal resolution of television, it is about 1200 TV-line. The projection lens according to the present invention offers proper performance as a lens of the high definition television.

Referring to FIGS. 4 through 9, Si refers to phosphor surface of the CRT. S11 refers to a panel surface of the CRT and C refers to a coolant.

The projection lens according to the embodiments of the present invention has utmost focusing capacity when the raster size of 5.0"–5.3" are displayed on the screen 9 to 15 times the SRT raster size.

In addition, the half field angle of the lens embodying the present invention is over 35° and F/number of lens is below 1.05. The distance from the screen to the phosphor surface Si of the fourth lens group 103 is very short, so that a television set with a thin thickness is possible with a full reflection mirror.

In particular, the projection lens, data of which are shown in tables I through V according to the present invention, is available to a 60–70 inch screen and the table VI shows for the screen of 40–50 inches.

In addition, the focal length of the lenses is 80–85 mm and is short enough to obtain a slim TV set.

How to refer to tables I through VI is as follows.

For example, the curvature of the screen is flat at infinity and the distance from the screen to the front surface S1 of the first lens elements L1 of the first lens group 100 is 1148.44 mm.

The space between the screen and the front surface S1 of the first lens element L1 is called an object space OBJ and the refractive index is 1.0 because the space is in air.

The curvature of the front surface S1 of the first lens group 100 is 79.70 mm, the thickness is 6.0 mm, the curvature ratio Nd of the first lens unit L1 is 1.4915 on the d-line (589 nm), and the Abbe number thereof is 57.9.

The front surface S1 of the first lens unit L1 is aspheric and aspheric coefficients K, A, B, C, and D are defined as the following equation.

$$Z=(r^2/R_D)/[1+\{1-(1+K)r^2/R_D^2\}^{1/2}]+A*r^4+B*r^6+C*r^8+D*r^{10} \quad (3)$$

where $R_D$ is the radius of curvature at optical axis and $R^2=X^2+y^2$.

Z-axis in the formula (3) is an optical axis. When the tangential direction of the lens is Y-axis, Z is the segmentation value of each lens.

The first to fifth lens elements L1 to L5 of the first to fourth lens groups 100 to 103 including the phosphor surface Si of the CRT and the radius, thickness, index, and Abbe number Vd of the panel surface S11 of the CRT are the same as the above.

The shape of the aspheric surface should preferably be maintained to be smooth for easy manufacturing.

In addition, the thickness of the plastic lens should preferably be designed within a range of 3 to 8 mm because the thickness is closely related to the manufacturing net price and the manufacturing time.

As a result, the projection lens according to the presently embodied invention includes a first lens group 100 having a small optical power for compensating for the spherical aberration which is closely related to the size of the lens aperture, a second lens group 101 having a large optical power in order to secure the stable performance and magnification ratio to surrounding temperature comprised by cementing the bi-convex second lens element L2 and the concave third lens element L3 having a dispersion different from that of the lens element L2, a third lens group 102 having a fourth lens element L4 which has the same side of the curvature $R_D$ of both side surfaces in order to compensate for the upper surface aberration and to enhance the brightness at the screen corner, and a fourth lens group 103 including a fifth lens element L5 having a high negative power to the upper surface of the screen in order to compensate for the field dependent aberrations. The projection lens including aforementioned elements according to the present invention requires certain predetermined conditions as shown in table VII, for example.

TABLE VII

| lens No. | lens spacing | | | | |
|---|---|---|---|---|---|
| | $f_0/f_1$ | $f_0/f_2$ | $f_0/f_3$ | $f_0/f_4$ | $f_0$ |
| 1 | 0.120 | 0.941 | 0.223 | −0.654 | 84.99 |
| 2 | 0.119 | 0.933 | 0.244 | −0.620 | 81.99 |
| 3 | 0.133 | 0.928 | 0.229 | −0.654 | 85.00 |
| 4 | 0.138 | 0.918 | 0.229 | −0.644 | 84.00 |
| 5 | 0.139 | 0.941 | 0.218 | −0.675 | 85.00 |
| 6 | 0.129 | 0.930 | 0.219 | −0.635 | 82.50 |

$$0.11 < f_0/f_1 < 0.14 \quad (4)$$
$$0.91 < f_0/f_2 < 0.95 \quad (5)$$
$$0.21 < f_0/f_3 < 0.25 \quad (6)$$
$$-0.68 < f_0/f_4 < 0.62 \quad (7)$$

where $f_0$ is the length of the entire projection lens, $f_1$ is the focal length of the first lens group, $f_2$ is the focal length of the second lens group, $f_3$ is the focal length of the third lens group, and $f_4$ is the focal length of the fourth lens group.

In addition, the following conditions shown in table VIII, for example, is required to obtain a predetermined performance and a brightness at the screen corner.

TABLE VIII

| lens No. | lens spacing | | | | | |
|---|---|---|---|---|---|---|
| | $D_{12}$ | $D_{23}$ | $D_{34}$ | $D_{12}/f_0$ | $D_{23}/f_0$ | $D_{34}/f_0$ |
| 1 | 35.80 | 14.36 | 34.00 | 0.421 | 0.169 | 0.400 |
| 2 | 30.75 | 10.29 | 34.75 | 0.366 | 0.122 | 0.414 |
| 3 | 27.83 | 11.40 | 35.23 | 0.327 | 0.134 | 0.414 |
| 4 | 28.40 | 10.00 | 35.79 | 0.338 | 0.119 | 0.426 |
| 5 | 32.20 | 11.14 | 34.14 | 0.379 | 0.131 | 0.402 |
| 6 | 33.49 | 11.39 | 34.74 | 0.138 | 0.138 | 0.421 | where $D_{12}$ is the distance between the first lens group 100 and the second lens group 101, and $f_0$ is the focal length of the entire lens.

$$0.32 < D_{12}/f_0 < 0.42 \quad (8)$$

When the distance $D_{23}$ between the second lens group 101 and the third lens group 102 meets the following condition, the coma aberration compensation is very effective in the extreme field.

$$1.1 < D_{23}/f_0 < 1.7 \quad (9)$$

In addition, the distance $D_{34}$ between the third lens group 102 and the fourth lens group 103 is required of the following condition.

$$0.40 < D_{34}/f_0 < 0.43 \quad (10)$$

As the distance $D_{34}$ increases, the brightness at the screen corner decreases. On the contrary, as the distance $D_{34}$ decreases the field curvature and the coma aberration occur, so that the focusing performance of the projection lens is degraded.

Meanwhile, the lens comprised of the cemented positive power lens and negative power lens having different dispersions is required to produce the second lens group to compensate for the chrominance aberration and the coma aberration.

As shown in table IX, for example, in the second lens group 101 the following conditions is required in order to effectively compensate for the chromatic aberration.

TABLE IX

| lens No. | powers of the second lens group | | | | | |
|---|---|---|---|---|---|---|
| | $f_0/f_{2a}$ | $f_0/f_{2b}$ | $V_{2a}$ | $V_{2b}$ | $f_{2a}/f_{2b}$ | $V_{2a}/V_{2b}$ |
| 1 | 1.221 | −0.304 | 60.7 | 27.5 | −0.249 | 2.207 |
| 2 | 1.227 | −0.326 | 60.7 | 27.5 | −0.266 | 2.207 |
| 3 | 1.150 | −0.239 | 60.7 | 27.5 | −0.208 | 2.207 |
| 4 | 1.144 | −0.241 | 60.7 | 23.8 | −0.211 | 2.55 |
| 5 | 1.192 | −0.277 | 60.7 | 22.6 | −0.232 | 2.686 |
| 6 | 1.204 | −0.302 | 60.7 | 31.2 | −0.251 | 1.946 | where $f_{2a}$ is the focal length of the second lens element L2 toward the screen in the second lens group, $V_{2a}$ is the dispersion of the material, $f_{2b}$ is the focal length of the third lens element L3 toward the CRT in the second lens group 101, and $V_{2b}$ is the dispersion of the material.

Accordingly, in the second lens group 101, it is required to provide the bi-convex lens having positive power and the concave lens having negative power in order to compensate for the chromatic aberration and the coma aberration.

$$-0.62 < (f_{2a}*V_{2a})/(f_{2b}*V_{2b}) < -0.4 \quad (11)$$

The formula (11) is referred to the following description.

The focal length changes $\delta f_2$, due to wavelength variation of the lens comprised of the second convex lens element L2 and the third concave lens element L3, each having a dispersion different from the other in the second lens group 101, is as follows.

$$\delta f_2 = 1/(f_{2a} * V_{2a}) + 1/(f_{2b} * V_{2b}) \quad (12)$$

Here, in order to maintain a predetermined focal distance for wavelength changes, $\delta f2$ should be zero; however, the chromatic aberration of the entire lens system element L2 and the third convex lens element L3 exist since the chromatic aberration existing from other lens groups is added thereto. In order to assign a proper chromatic aberration of the second lens group 101, it is possible to designate the relative value of $(f_{2a} * V_{2a})$ and $(f_{2b} * V_{2b})$ in the formula (12).

If the value of $(f_{2a} * V_{2a})$ and $(f_{2b} * V_{2b})$ is larger than −0.4 in the formula (11), the chromatic aberration becomes an under type because the curvature ratio of the second lens element L2 relatively increases. On the contrary, if the value of $(f_{2a} * V_{2a})$ and $(f_{2b} * V_{2b})$ is smaller than −0.6 in the formula (11), the chromatic aberration becomes an over type since the power of the third lens element L3 increases, so that the chromatic aberration can not be corrected.

Accordingly, the chromatic condition is well achieved when the value of $(f_{2a} * V_{2a})/(f_{2b} * V_{2b})$ is between −0.62 and −0.4.

Figure 18:
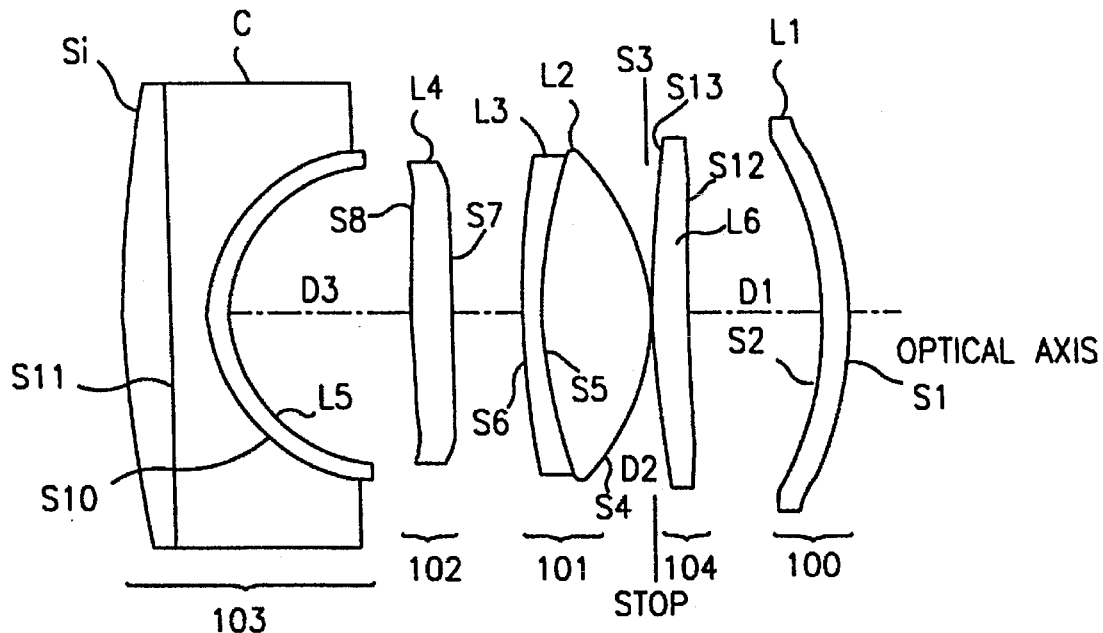
FIG. 18 is a side view showing a projection lens of a seventh embodiment according to the present invention.
Figure 19:
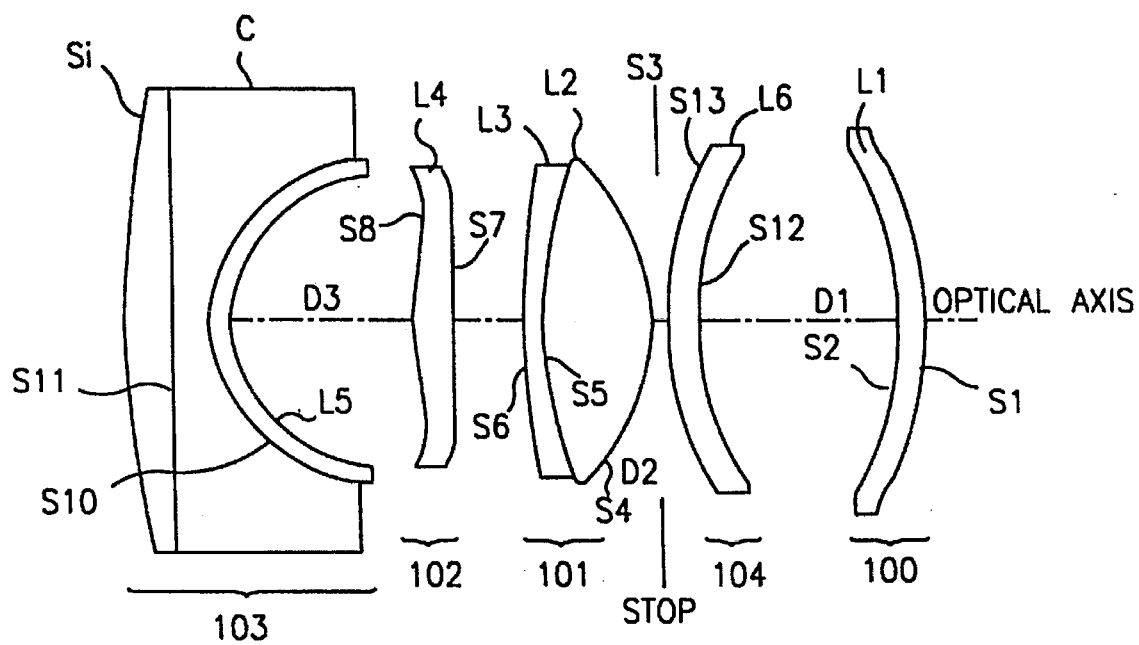
FIG. 19 is a side view showing a projection lens of an eighth embodiment according to the present invention.
Figure 20:
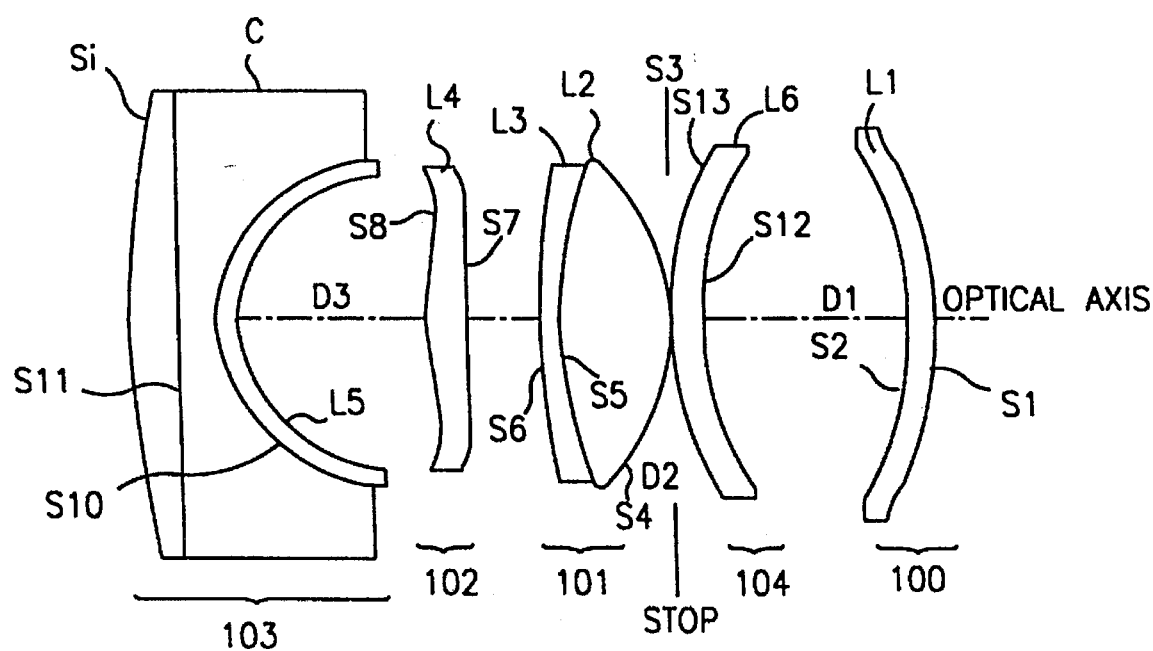
FIG. 20 is a side view showing a projection lens of a ninth embodiment according to the present invention.

In addition, referring to FIGS. 18 through 20, there are shown other embodiments of the present invention using five lens groups comprising 6 lenses.

Here, there is provided a fifth lens group 104 between the first lens group 100 and the second lens group 101 for adapting a spherical surface in order to compensate for the astigmatism and the coma aberration, and the operation and effects are the same as in FIGS. 4 through 9.

In addition, the aberrations indicating the performance of the lenses embodying the present invention are shown in FIGS. 21A through 23B for the construction of the lenses shown in FIGS. 18 through 20.

Figure 2A:
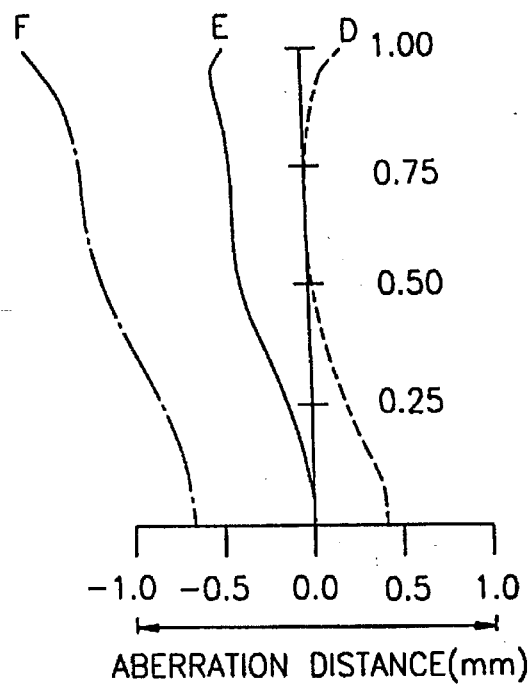
FIGS. 2A to 2C are aberration graphs showing the projection shown in FIG. 1.
Figure 2B:
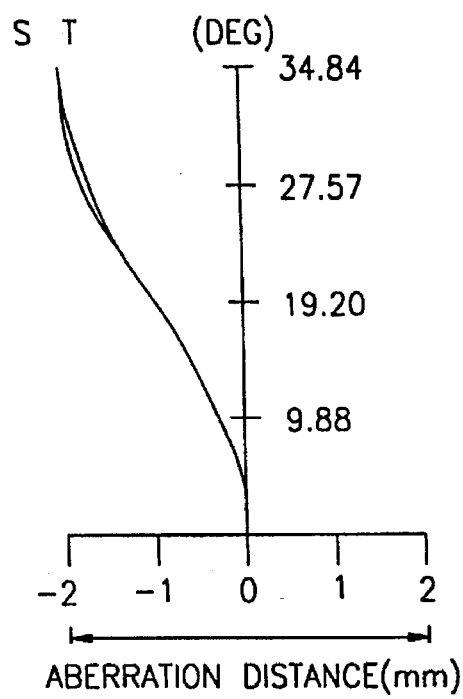
Figure 2C:
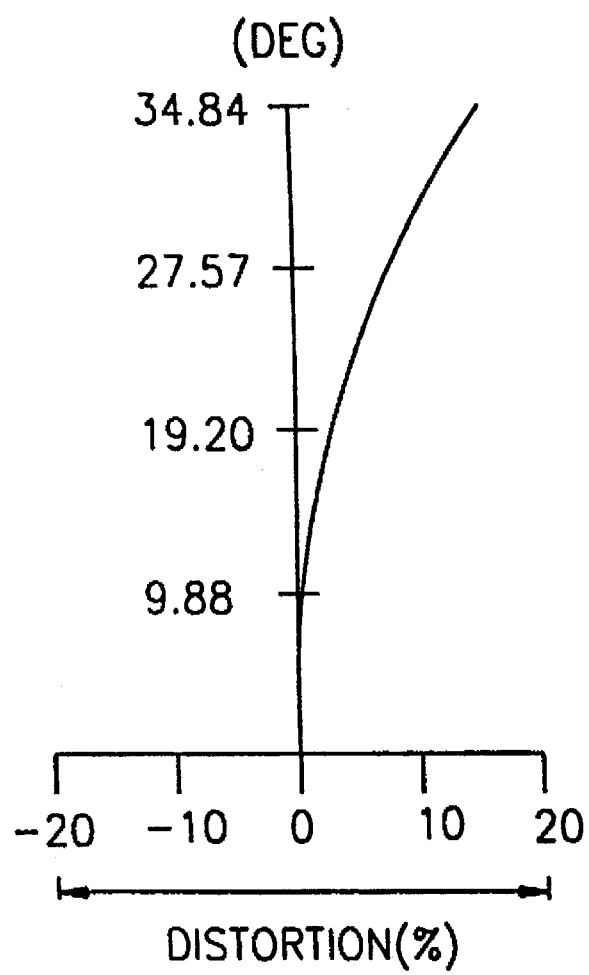

Here, there are shown a highly compensated spherical aberration, a chromatic aberration and an upper portion aberration in comparison with aberrations shown in FIGS. 2A-2C.

In addition, examples of the detailed embodiments of the first through fifth lens group 100 to 104 are well shown in the following tables X to XII.

TABLE X

Figure 21A:
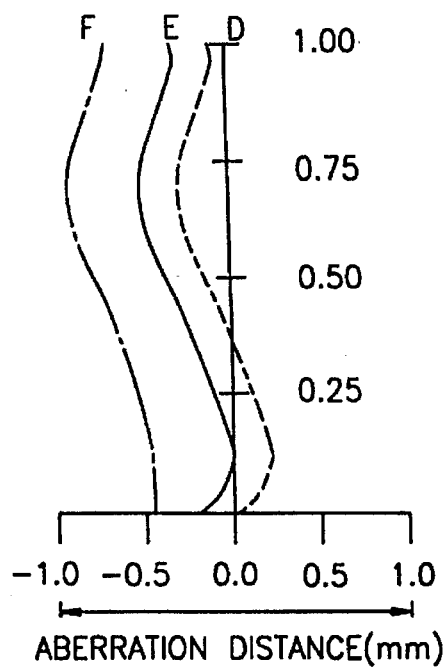
FIG. 21A is a characteristic diagram showing a spheric surface aberration of the projection lens shown in FIG. 18.
Figure 21B:
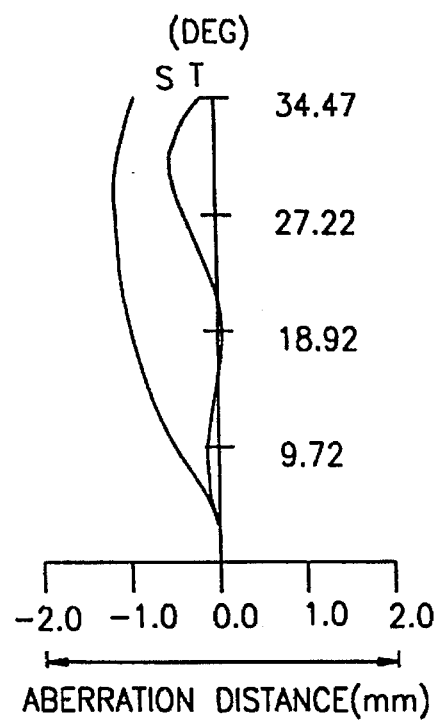
FIG. 21B is a characteristic diagram showing an upper surface aberration of the projection lens shown in FIG. 18.

The seventh embodiment (FIGS. 18 and 21)

| No | Radius | Thickness | Refractive Index (Nd) | Abbe No. (Vd) |
|---|---|---|---|---|
| OBJ | infinity | 1195.000000 | | |
| S1: | 79.40808 | 8.00000 | 1.4915 | 57.9 |
| S2: | 106.54364 | 30.764695 | | |
| S3: | infinity | 0.000000 | | |
| S4: | 70.38548 | 23.002122 | 1.58913 | 61.3 |
| S5: | −112.57873 | 4.000000 | 1.75520 | 27.5 |
| S6: | −264.61040 | 14.595114 | | |
| S7: | 665.72211 | 8.000000 | 1.4915 | 57.9 |
| S8: | −290.20531 | 32.470461 | | |
| S9: | −50.00000 | 3.500000 | 1.500 | 52.0 |
| S10: | −52.00000 | 9.000000 | 1.4392 | |
| S11: | infinity | 14.100000 | 1.5399 | |
| S12: | −325.94296 | 7.251958 | 1.4915 | 57.9 |
| S13: | −220.18334 | 0.415650 | | |
| IMG | −350.00000 | −0.350 | | |

Aspherical surface coefficients for aspherical surfaces:

| No. | K | A | B | C | D |
|---|---|---|---|---|---|
| S1: | −0.882964 | −0.5842E-07 | −0.40007E-09 | 0.6434E-13 | −0.4381E-18 |
| S2: | 3.331045 | −0.6086E-07 | −0.4104E-09 | 0.1274E-12 | −0.1052E-16 |
| S7: | −162.951939 | −0.1796E-07 | 0.5040E-10 | −0.9532E-13 | 0.7232E-16 |
| S8: | 8.798351 | 0.1002E-05 | 0.6651E-10 | 0.8984E-13 | 0.3255E-17 |
| S9: | 0.391387 | −0.3605E-06 | −0.2000E-09 | 0.5406E-12 | −0.1133E-15 |
| S12: | −99.142385 | 0.1126E-06 | 0.1210E-09 | 0.1978E-13 | −0.2791E-17 |
| S13: | −2.294650 | 0.4261E-07 | −0.3628E-10 | −0.5793E-14 | −0.2079E-17 |

TABLE XI

Figure 22A:
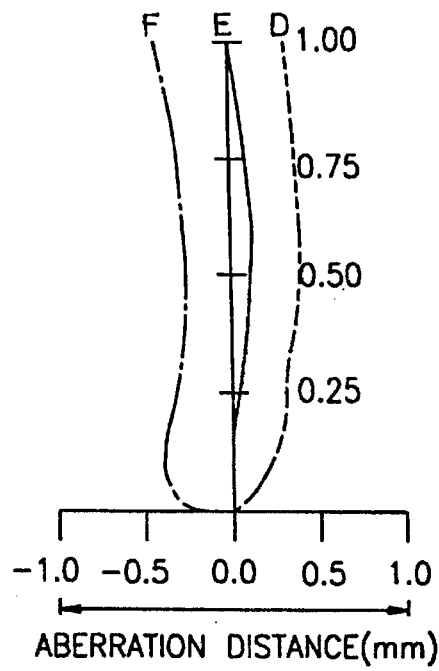
FIG. 22A is a characteristic diagram showing an aspheric surface aberration of the projection lens shown in FIG. 19.
Figure 22B:
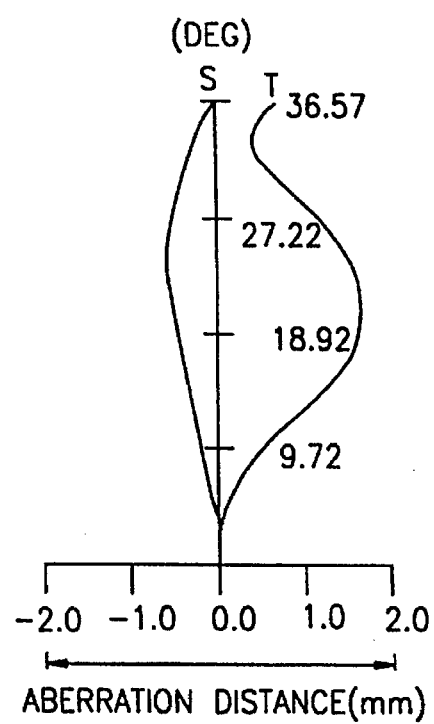
FIG. 22B is a characteristic diagram showing an upper surface negative power aberration of the projection lens shown in FIG. 19.

The eighth embodiment (FIGS. 19 and 22)

| No | Radius | Thickness | Refractive Index (Nd) | Abbe No. (Vd) |
|---|---|---|---|---|
| OBJ | infinity | 1096.257108 | | |
| S1: | 84.90190 | 8.00000 | 1.4915 | 57.9 |
| S2: | 111.08697 | 33.169216 | | |
| S3: | infinity | 0.00booo | | |

TABLE XI-continued

The eighth embodiment (FIGS. 19 and 22)

| | | | | |
|---|---|---|---|---|
| S4: | 67.95746 | 20.332182 | 1.6000 | 62.0 |
| S5: | −119.65643 | 3.500000 | 1.64648 | 29.4 |
| S6: | −292.77930 | 15.020598 | | |
| S7: | 489.82938 | 8.000000 | 1.4915 | 57.9 |
| S8: | −193.21574 | 33.000000 | | |
| S9: | −50.00000 | 3.500000 | 1.500 | 52.0 |
| S10: | −52.00000 | 9.000000 | 1.4392 | |
| S11: | infinity | 14.100000 | 1.5399 | |
| S12: | −114.42480 | 6.000000 | 1.4915 | 57.9 |
| S13: | −119.39778 | 1.478004 | | |
| IMG | −350.00000 | −0.350 | | |

Aspherical surface coefficients for aspherical surfaces:

| No. | K | A | B | C | D |
|---|---|---|---|---|---|
| S1: | −0.806323 | −0.3777E-07 | −0.3712E-09 | 0.5264E-13 | 0.6079E-17 |
| S2: | 3.278113 | −0.7632E-09 | −0.4493E-09 | 0.1080E-12 | −0.9151E-17 |
| S7: | −27.866040 | 0.2701E-08 | 0.7241E-09 | 0.1455E-12 | −0.1516E-15 |
| S8: | 2.923127 | 0.1398E-05 | 0.2932E-09 | 0.6441E-12 | −0.1491E-15 |
| S9: | 0.391387 | −0.3605E-06 | −0.2000E-09 | 0.5406E-12 | −0.1133E-15 |
| S12: | −2.063868 | −0.4495E-07 | −0.6479E-10 | −0.5953E-13 | −0.6089E-17 |
| S13: | −1.655792 | −0.8561E-09 | −0.1072E-09 | −0.1307E-13 | −0.1480E-16 |

TABLE XII

Figure 23A:
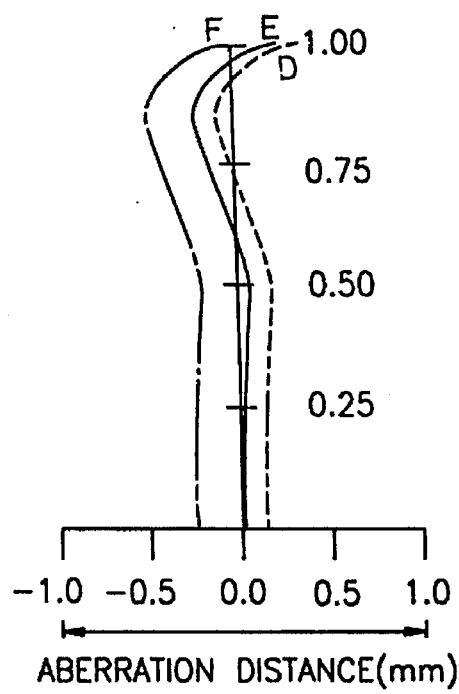
FIG. 23A is a characteristic diagram showing an aspheric surface aberration of the projection lens shown in FIG. 20.
Figure 23B:
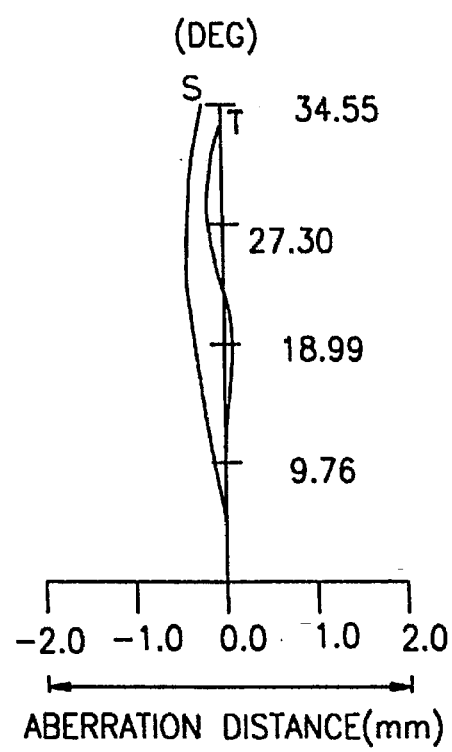
FIG. 23B is a characteristic diagram showing an upper surface negative power aberration of the projection lens shown in FIG. 20.

The ninth embodiment (FIGS. 20 and 23)

| No | Radius | Thickness | Refractive Index (Nd) | Abbe No. (Vd) |
|---|---|---|---|---|
| OBJ | infinity | 1195.000000 | | |
| S1: | 83.31297 | 8.00000 | 1.4915 | 57.9 |
| S2: | 113.05977 | 26.860717 | | |
| S3: | infinity | 0.000000 | | |
| S4: | 74.19931 | 24.035511 | 1.6000 | 62.000 |
| S5: | −103.81774 | 3.500000 | 1.6938 | 27.7 |
| SG: | −219.57590 | 15.829046 | | |
| S7: | 788.22253 | 8.000000 | 1.4915 | 57.9 |
| S8: | −156.39496 | 34.087534 | | |
| S9: | −50.00000 | 3.500000 | 1.500 | 52.0 |
| S10: | −52.00000 | 9.000000 | 1.4392 | |
| S11: | infinity | 14.100000 | 1.5399 | |
| S12: | −97.69183 | 8.000000 | 1.4915 | 57.9 |
| S13: | −97.51246 | 0.191678 | | |
| IMG | −350.00000 | 0.0 | | |

Aspherical surface coefficients for aspherical surfaces:

| No. | K | A | B | C | D |
|---|---|---|---|---|---|
| S1: | −0.979603 | −0.7759E-07 | −0.3760E-09 | 0.4158E-13 | 0.5735E-17 |
| S2: | 3.443852 | −0.5298E-07 | −0.4468E-09 | 0.1225E-12 | −0.9121E-17 |
| S7: | −1650.645354 | −0.1206E-06 | 0.6508E-09 | 0.1161E-12 | −0.1683E-15 |
| S8: | 6.438830 | 0.1338E-05 | 0.2611E-09 | 0.5949E-12 | −0.2854E-15 |
| S9: | 0.391387 | −0.3605E-06 | −0.2000E-09 | 0.5406E-12 | −0.1133E-15 |
| S12: | −2.028168 | −0.4095E-07 | −0.1209E-10 | −0.6173E-13 | −0.2029E-16 |
| S13: | −1.592399 | 0.1854E-07 | −0.1559E-09 | −0.2062E-13 | −0.1821E-16 |

The first lens group 100 in FIGS. 18 to 20 adapts an aspheric surface to compensate for the spherical aberration, and the second lens group 101 has high optical power as much as to minimize the focal surface shift in accordance with the temperature and environmental changes.

In addition, the third lens group 102 adapts an aspheric surface to compensate for the coma aberration, and both sides S9 of the fifth lens elements L5 of the fourth lens group 103 also adapt an aspheric surface to compensate for the upper surface aberration.

In addition, the fifth lens group 104 adapts aspheric surfaces S12 and S13 to compensate for the astigmatism and coma aberration.

In addition, as shown in table X, the curvature ratio of the screen is infinity and flat, and the distance between the screen and the front surface S1 of the first lens group 100 is 1195 nm.

The curvature ratio of the front surface S1 of the first lens group 100, as shown in table X, is 79.40808 mm, the thickness thereof is 8.0 mm, the curvature ratio of the lens materials is 1.4915 on the d-line and the Abbe number is 57.9 on the d-line.

S1 is the aspheric surface and the equation thereof is shown in the formula (3).

How to refer to the tables X to XII is the same as in the first to fifth lens groups 101 to 104.

In addition, the following conditions are required so that the projection lens can have a good performance with reference to the tables X to XIII.

TABLE XIII

| lens | lens spacing between lens groups | | | | | |
|---|---|---|---|---|---|---|
| No. | $f_0/f_1$ | $f_0/f_2$ | $f_0/f_3$ | $f_0/f_4$ | $f_0/f_5$ | $f_0$ |
| 1 | 0.156 | 0.859 | 0.219 | −0.626 | 0.067 | 89.894 |
| 2 | 0.128 | 0.886 | 0.301 | −0.592 | −0.009 | 84.945 |
| 3 | 0.151 | 0.892 | 0.226 | −0.619 | 0.013 | 88.854 |
| | $0.128 < f_0/f_1 < 0.156$ | | | | | (13) |
| | $0.859 < f_0/f_2 < 0.892$ | | | | | (14) |
| | $0.219 < f_0/f_3 < 0.301$ | | | | | (15) |
| | $-0.626 < f_0/f_4 < -0.592$ | | | | | (16) |
| | $-0.009 < f_0/f_5 < 0.067$ | | | | | (17) | where $f_0$ is the entire focal distance of the projection lens, $f_1$ is the focal distance of the first lens group, $f_2$ is the focal distance of the second lens group, $f_3$ is the focal distance of the third lens group, $f_4$ is the focal distance of the fourth lens group, and $f_5$ is the focal distance of the fifth lens group.

In addition, in the projection lens, the positive optical power is provided at the second lens group 101 as shown in the tables X to XII and the negative optical power is provided at the fourth lens group 103.

The projection lens of the present invention is cemented with the second convex lens group 101 having a little dispersion, the second concave lens element L2 having a big dispersion, and the third lens element L3.

Here, the following conditions shown in the table XIV are required to secure a predetermined focusing performance and the surrounding light ratio and to take a preferred construction of the lens.

TABLE XIV

| lens | lens spacing | | | | | |
|---|---|---|---|---|---|---|
| No. | $D_1$ | $D_2$ | $D_3$ | $D_1/f_0$ | $D_2/f_0$ | $D_3/f_0$ |
| 1 | 30.77 | 0.416 | 32.47 | 0.342 | 0.169 | 0.361 |
| 2 | 33.17 | 1.478 | 33.00 | 0.392 | 0.122 | 0.388 |
| 3 | 26.86 | 0.192 | 34.09 | 0.302 | 0.134 | 0.384 |
| | $0.302 < D_1/f_0 < 0.392$ | | | | | (18) |
| | $0.002 < D_2/f_0 < 0.017$ | | | | | (19) |
| | $0.361 < D_3/f_0 < 0.388$ | | | | | (20) | where $D_1$ is the distance between the first lens group 100 and the fifth lens group 104, $D_2$ is the distance between the fifth lens group 104 and the second lens group 101, $D_3$ is the distance between the third lens group 102 and the fourth lens group 103, and $f_0$ is the focal distance of the entire lenses.

In addition, the projection lens shown in FIGS. 18 to 20 has the second lens group 101 and the concave lens elements having a negative optical power.

In addition, the following conditions shown in the table IX should preferably be met to advantageously compensate for the chromatic aberration of the lens.

TABLE IX

| lens | lenses power of the second lens group | | | | | |
|---|---|---|---|---|---|---|
| No. | $f_0/f_{2a}$ | $f_0/f_{2b}$ | $V_{2a}$ | $V_{2b}$ | $f_{2a}/f_{2b}$ | $V_{2a}/V_{2b}$ |
| 1 | 1.170 | −0.345 | 61.3 | 27.5 | −0.295 | 2.229 |
| 2 | 1.132 | −0.271 | 62.0 | 29.4 | −0.240 | 2.109 |
| 3 | 1.174 | −0.312 | 62.0 | 27.7 | −0.266 | 2.238 |
| | $1.132 < f_0/f_{2a} < 1.174$ | | | | | (21) |
| | $-0.345 < f_0/f_{2b} < -0.271$ | | | | | (22) |
| | $-0.295 < f_{2a}/f_{2b} < -0.240$ | | | | | (23) |
| | $2.109 < f_{2a}/f_{2b} < 2.238$ | | | | | (24) | where $f_{2a}$ is the focal distance of the second lens element L2 toward the screen, $V_{2a}$ is the dispersion (Abbe) of the material, $f_{2b}$ is the focal distance of the third lens element L3 towrd the CRT, and $V_{2b}$ is the dispersion of the material.

As disclosed above, the focusing performance and preferred luminance is significantly enhanced by adapting the same lens construction in the red, blue and green CRTs through advantageously correcting chromatic aberrations and residual aberrations by providing a minimized lens construction according to the embodiments of the present invention, and in addition to that, the more shortened focus and high light amount can be secured.

In addition, it is possible to implement the horizontal resolution of 1200 TV-lines. In comparison with the lens for NTSC having four lenses or five lenses, the present invention discloses the projection lens capable of reducing manufacturing cost, and thereby the use thereof can be possible for the NTSC, monitor and the projection lens television.

What is claimed is:

1. A projection lens, comprising:

a first lens group, including a single lens convex to a screen, said first lens group having a positive optical power for eliminating a spherical aberration;

a second lens group having a positive optical power and including a positive element and a negative element having a dispersion different from that of the positive element;

a third lens group having a positive optical power on an optical axis thereof and having a meniscus shape concave to the screen at the optical axis and convex to the screen adjacent an outer extent of a clear aperture thereof; and a fourth lens group having a negative optical power and being concave to the screen for compensating for field dependent aberrations, wherein said projection lens satisfies the condition:

$0.32 < D_{12}/f_0 < 0.42$ where $D_{12}$ denotes the distance between the first lens group and the second lens group and $f_0$ denotes the focal length of the entire projection lens, and wherein $0.11 < f_0/f_1 < 0.14$ $0.91 < f_0/f_2 < 0.95$ $0.21 < f_0/f_3 < 0.25$ $-0.68 < f_0/f_4 < -0.62$ where $f_0$ is the overall focal length of the projection lens, $f_1$ is the focal length of the first lens group, $f_2$ is the focal length of the second lens group, $f_3$ is the focal length of the third lens group, and $f_4$ is the focal length of the fourth lens group.

2. The projection lens of claim 1, wherein said first lens group is formed of an aspherical single lens element having an optical power which is positive at the optical axis and which changes to a negative optical power adjacent the outer extend of the clear aperture in order to compensate for an aperture-dependent aberration.

3. The projection lens of claim 1, wherein said first lens group and said third lens group are formed of a plastic material, each of said first lens group and said third lens group having at least one aspherical surface.

4. The projection lens of claim 1, wherein said second lens group is formed of glass.

5. The projection lens of claim 1, wherein said third lens group is formed of a single lens element.

6. The projection lens of claim 1, wherein said second lens group includes a bi-convex lens having an Abbe's number of greater than 60 and a lens concave to the screen and having an Abbe's number of less than 35.

7. The projection lens of claim 1, wherein said second lens group satisfies the condition:

$$-0.62<(f_{2a}*V_{2a})/(f_{2b}*V_{2b})<-0.4$$

where $f_{2a}$ is the focal length of the positive element having a positive optical power in the second lens group, $f_{2b}$ is the focal length of the negative element having a negative optical power in the second lens group, $V_{2a}$ is the Abbe's number of the positive element having a positive optical power in the second lens group, and $V_{2b}$ is the Abbe's number of the negative element having a negative optical power in the second lens group.

8. The projection lens of claim 1, wherein said third lens group is formed of a single lens element having a concave surface which changes to a convex surface adjacent an outer extent of a clear aperture thereof to improve brightness at a screen corner and correct comma aberration.

9. The projection lens of claim 1, wherein said projection lens satisfies the condition:

$$1.1<D_{23}/f_0<1.7$$

where $D_{23}$ is the distance between the second lens group and the third lens group and $f_0$ is the overall focal length of the projection lens.

10. The projection lens of claim 1, wherein the distance between said third lens group and said fourth lens group satisfies the condition:

$$0.40<D_{34}/f_0<0.43$$

where $D_{34}$ is the distance between the third lens group and the fourth lens group and $f_0$ is the focal length of the entire projection lens.

11. The projection lens of claim 1, wherein a front curvature and a rear curvature of said third lens group have the same power sign designation.

12. A projection lens, comprising:

a first lens group, including a single lens convex to a screen, said first lens group having a positive optical power for eliminating a spherical aberration;

a second lens group having a positive optical power and including a positive element and a negative element having a dispersion different from that of the positive element;

a third lens group having a positive optical power on an optical axis thereof and having a meniscus shape concave to the screen at the optical axis and convex to the screen adjacent an outer extent of a clear aperture thereof; and a fourth lens group having a negative optical power and being concave to the screen for compensating for field dependent aberrations, wherein said projection lens satisfies the condition:

$$0.32<D_{12}/f_0<0.42$$

where $D_{12}$ denotes the distance between the first lens group and the second lens group and $f_0$ denotes the focal length of the entire projection lens, and wherein said projection lens further satisfies the condition:

$$1.1<D_{23}/f_0<1.7$$

where $D_{23}$ is the distance between the second lens group and the third lens group and $f_0$ is the overall focal length of the projection lens.

13. The projection lens of claim 12, wherein said first lens group is formed of an aspherical single lens element having an optical power which is positive at the optical axis and which changes to a negative optical power adjacent the outer extend of the clear aperture in order to compensate for an aperture-dependent aberration.

14. The lens of claim 12, wherein each of said first lens group and said third lens group is formed of a plastic material which has at least one aspherical surface.

15. The projection lens of claim 12, wherein said second lens group includes a bi-convex lens having an Abbe's number of greater than 60 and a lens concave to the screen and having an Abbe's number of less than 35.

16. The projection lens of claim 12, wherein said second lens group satisfies the condition:

$$-0.62<(f_{2a}*V_{2a})/(f_{2b}*V_{2b})<-0.4$$

where $f_{2a}$ is the focal length of the positive element having a positive optical power in the second lens group, $f_{2b}$ is the focal length of the negative element having a negative optical power in the second lens group, $V_{2a}$ is the Abbe's number of the positive element having a positive optical power in the second lens group, and $V_{2b}$ is the Abbe's number of the negative element having a negative optical power in the second lens group.

17. The projection lens of claim 12, wherein said third lens group is formed of a single lens element having a concave surface which changes to a convex surface adjacent an outer extent of a clear aperture thereof to improve brightness at a screen corner and correct comma aberration.

18. The projection lens of claim 12, wherein a front o curvature and a rear curvature of said third lens group have the same power sign designation.

19. A projection lens, comprising:

a first lens group, including a single lens convex to a screen, the first lens group having a positive optical power for eliminating a spherical aberration;

a second lens group having a positive optical power and including a positive element and a negative element having a dispersion different from that of the positive element;

a third lens group having a positive optical power on an optical axis thereof and having a meniscus shape concave to the screen at the optical axis and convex to the screen adjacent an outer extent of a clear aperture thereof; and a fourth lens group having a negative optical power and being concave to the screen for compensating for field dependent aberrations, wherein said projection lens satisfies the condition:

$$0.32 < D_{12}/f_0 < 0.42$$

where $D_{12}$ denotes the distance between the first lens group and the second lens group and $f_0$ denotes the focal length of the entire projection lens, and wherein the distance between said third lens group and said fourth lens group satisfies the condition:

$$0.40 D_{34}/f_0 < 0.43$$

where $D_{34}$ is the distance between the third lens group and the fourth lens group and $f_0$ is the focal length of the entire projection lens.

20. The projection lens of claim 19, wherein said first lens group is formed of an aspherical single lens element having an optical power which is positive at the optical axis and which changes to a negative optical power adjacent the outer extend of the clear aperture in order to compensate for an aperture-dependent aberration.

21. The lens of claim 19, wherein each of said first lens group and said third lens group is formed of a plastic material which has at least one aspherical surface.

22. The projection lens of claim 19, wherein said second lens group includes a bi-convex lens having an Abbe's number of greater than 60 and a lens concave to the screen and having an Abbe's number of less than 35.

23. The projection lens of claim 19, wherein said second lens group satisfies the condition:

$$-0.62 < (f_{2a} * V_{2a})/(f_{2b} * V_{2b}) < -0.4$$

where $f_{2a}$ is the focal length of the positive element having a positive optical power in the second lens group, $f_{2b}$ is the focal length of the negative element having a negative optical power in the second lens group, $V_{2a}$ is the Abbe's number of the positive element having a positive optical power in the second lens group, and $V_{2b}$ is the Abbe's number of the negative element having a negative optical power in the second lens group.

24. The projection lens of claim 19 wherein said third lens group is formed of a single lens element having a concave surface which changes to a convex surface adjacent an outer extent of a clear aperture thereof to improve brightness at a screen corner and correct comma aberration.

25. The projection lens of claim 19, wherein a front curvature and a rear curvature of said third lens group have the same power sign designation.

* * * * *